(12) United States Patent
Jung et al.

(10) Patent No.: US 12,495,707 B2
(45) Date of Patent: Dec. 9, 2025

(54) DISPLAY DEVICE AND PEN TOUCH SYSTEM

(71) Applicant: LG Display Co., Ltd., Seoul (KR)

(72) Inventors: DongRyul Jung, Paju-si (KR); Jisu Yoon, Paju-si (KR); Jiseok Yang, Paju-si (KR); Kyuhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/745,452

(22) Filed: Jun. 17, 2024

(65) Prior Publication Data
US 2025/0048893 A1 Feb. 6, 2025

(30) Foreign Application Priority Data
Jul. 31, 2023 (KR) .................. 10-2023-0099433

(51) Int. Cl.
| | |
|---|---|
| *H10K 59/80* | (2023.01) |
| *G06F 3/03* | (2006.01) |
| *G06F 3/0354* | (2013.01) |
| *G06F 3/038* | (2013.01) |
| *H10K 39/34* | (2023.01) |
| *G09G 3/3233* | (2016.01) |
| *H10K 59/35* | (2023.01) |

(52) U.S. Cl.
CPC ......... *H10K 59/875* (2023.02); *G06F 3/0317* (2013.01); *G06F 3/03542* (2013.01); *G06F 3/038* (2013.01); *H10K 39/34* (2023.02); *G09G 3/3233* (2013.01); *G09G 2300/0842* (2013.01); *G09G 2354/00* (2013.01); *H10K 59/35* (2023.02)

(58) Field of Classification Search
CPC .... G06F 3/0317; G06F 3/038; G06F 3/03545; G06F 3/03542; G09F 3/3233
See application file for complete search history.

(56) References Cited

U.S. PATENT DOCUMENTS

| | | | | |
|---|---|---|---|---|
| 6,577,374 | B1 * | 6/2003 | Nakata | G02F 1/136227 349/44 |
| 7,532,299 | B2 * | 5/2009 | Paek | G02F 1/13394 349/122 |
| 7,633,595 | B2 * | 12/2009 | Kim | G02F 1/13394 349/110 |
| 10,996,796 | B2 * | 5/2021 | Song | G02F 1/133528 |

(Continued)

*Primary Examiner* — Olga V Merkoulova
(74) *Attorney, Agent, or Firm* — Fenwick & West LLP

(57) ABSTRACT

A display device is disclosed that includes a first substrate, a plurality of first color filters included in a color filter layer and transmitting first color light having a first color wavelength included in a first wavelength band, a plurality of second color filters included in the color filter layer and transmitting second color light having a second color wavelength included in the first wavelength band, a plurality of third color filters included in the color filter layer and transmitting third color light having a third color wavelength included in the first wavelength band, and a photoactive layer responsive to light having a second wavelength included in a second wavelength band different from the first wavelength band and including two or more openings overlapping with two or more second color filters among the plurality of second color filters.

20 Claims, 26 Drawing Sheets

(56) References Cited

U.S. PATENT DOCUMENTS

| | | | |
|---|---|---|---|
| 2005/0140892 A1* | 6/2005 | Kim | G02F 1/13394 |
| | | | 349/139 |
| 2005/0140915 A1* | 6/2005 | Paek | G02F 1/13394 |
| | | | 349/155 |
| 2014/0145066 A1* | 5/2014 | Geaghan | G06F 3/0317 |
| | | | 250/206.1 |
| 2022/0182508 A1* | 6/2022 | Chu | H04N 1/0288 |
| 2024/0074276 A1* | 2/2024 | Kim | H10K 59/8792 |
| 2024/0365633 A1* | 10/2024 | Song | H10K 59/38 |

* cited by examiner

DISPLAY DEVICE AND PEN TOUCH SYSTEM

CROSS-REFERENCE TO RELATED APPLICATION

This application claims the priority benefit of Republic of Korea Patent Application No. 10-2023-0099433, filed on Jul. 31, 2023 in the Korean Intellectual Property Office, which is incorporated by reference in its entirety.

TECHNICAL FIELD

The present disclosure generally relates to electronic devices with displays, and more specifically, to a display device and a pen touch system.

BACKGROUND

As the information-oriented society has been developed, various needs for display devices for displaying an image have increased. Various types of display devices, such as liquid crystal display (LCD) devices, organic light emitting diode (OLED) display devices, and the like have been developed and widely used. Display devices may be stand-alone devices or integrate with other devices. Display devices have been applied to various electronic devices such as smart phones, digital cameras, laptop computers, navigation devices, smart televisions and the like.

In addition, in order to provide a more intuitive use environment, display devices have been increasingly provided with a user interface configured to allow a touch input by an object such as a user's body (e.g., a finger), a pen, and the like. Recently, to allow versatility of operation for various applications and more detailed input, development has been progressing on enhanced pen-touch capable display devices.

SUMMARY

One or more embodiments of the present disclosure may provide a display device and a pen touch system that are capable of more accurately sensing a pen touch based on an optical technique.

One or more embodiments of the present disclosure may provide a display device and a pen touch system that are capable of sensing a pen touch based on an optical technique by using one or more color filters included in a display panel.

One or more embodiments of the present disclosure may provide a display device and a pen touch system that include a display panel in which a light control structure capable of allowing a pen to sense a touch is integrated.

One or more embodiments of the present disclosure may provide a display device and a pen touch system that include a display panel in which a light control structure configured to enable pen touch sensing while not affecting light emitting performance for image display is integrated.

According to example embodiments of the present disclosure, a display device can be provided that includes a first substrate, a plurality of first color filters included in a color filter layer and transmitting first color light having a first color wavelength included in a first wavelength band, a plurality of second color filters included in the color filter layer and transmitting second color light having a second color wavelength included in the first wavelength band, a plurality of third color filters included in the color filter layer and transmitting third color light having a third color wavelength included in the first wavelength band, and a photoactive layer responsive to light having a second wavelength included in a second wavelength band different from the first wavelength band and including two or more openings.

The two or more openings may overlap with two or more second color filters among the plurality of second color filters.

Each of the plurality of second color filters may absorb the light having the second wavelength.

The photoactive layer may reflect the light having the second wavelength, or convert the light having the second wavelength into light having one or more other wavelengths and radiate the light having the one or more other wavelengths.

The second color wavelength may be shorter than the first color wavelength and longer than the third color wavelength.

According to example embodiments of the present disclosure, a pen touch system can be provided that includes a display device including a first substrate, a plurality of color filters transmitting light having a first wavelength included in a first wavelength band, and a photoactive layer responsive to light having a second wavelength included in a second wavelength band different from the first wavelength band, and a pen configured to output the light having the second wavelength to the display device, receive redirected light coming from the display device, and output sensing data based on the redirected light to the display device.

The plurality of color filters may include a plurality of first color filters located in a color filter layer and transmitting first color light having a first color wavelength included in a first wavelength band, a plurality of second color filters located in the color filter layer and transmitting second color light having a second color wavelength included in the first wavelength band, and a plurality of third color filters located in the color filter layer and transmitting third color light having a third color wavelength included in the first wavelength band.

The photoactive layer may include two or more openings. The two or more openings may overlap with two or more second color filters among the plurality of second color filters.

Each of the plurality of second color filters may absorb the light having the second wavelength.

The photoactive layer may reflect the light having the second wavelength, or convert the light having the second wavelength into light having one or more other wavelengths and radiate the light having the one or more other wavelengths.

According to one or more aspects of present disclosure, a display device and a pen touch system may be provided that are capable of more accurately sensing a pen touch based on an optical technique.

According to one or more aspects of present disclosure, a display device and a pen touch system may be provided that are capable of sensing a pen touch based on an optical technique by using one or more color filters included in a display panel.

According to one or more aspects of present disclosure, a display device and a pen touch system may be provided that include a display panel in which a light control structure capable of allowing a pen to sense a touch is integrated.

According to one or more aspects of present disclosure, a display device and a pen touch system may be provided that include a display panel in which a light control structure configured to enable pen touch sensing while not affecting light emitting performance for image display is integrated.

According to one or more aspects of present disclosure, a display device and a pen touch system may be provided that include a display panel in which a light control structure configured to allow a pen to sense a touch is integrated, and thereby, provide advantages of reducing the thickness of the display device and helping to simplify the assembly process of the display device. Thus, one or more aspects of present disclosure can help to reduce the weight and optimize the process of the display device.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
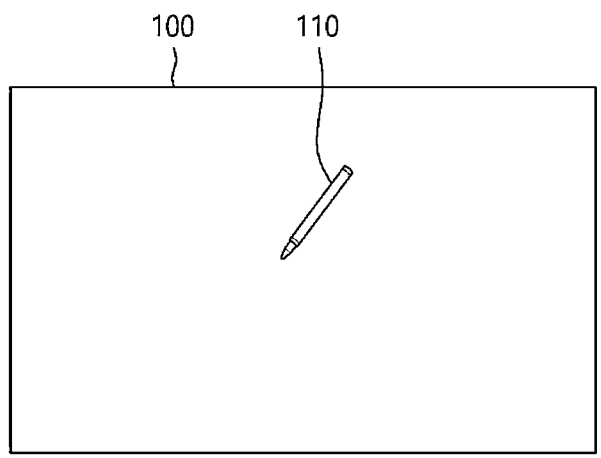
FIG. 1 illustrates an example pen touch system according to embodiments of the present disclosure.

Reference will now be made in detail to embodiments of the present disclosure, examples of which may be illustrated in the accompanying drawings. In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," "A", "B", "(a)", or "(b)", and the like may be used herein to describe various elements, these elements should not be interpreted to be limited by these terms as they are not used to define a particular order or precedence. These terms are used only to distinguish one element from another; thus, related elements should not be interpreted to be limited by these terms as they are not used to define a particular order or precedence.

Further, the expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed" or "interposed" between the elements or layers, unless otherwise specified. Further, the another element may be included in one or more of the two or more elements connected, combined, coupled, or contacted (to) one another.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers "disposed" or "interposed" between the elements or layers, unless otherwise specified.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In describing a temporal relationship, when the temporal order is described as, for example, "after," "subsequent," "next," or "before," a case which is not continuous may be included unless a more limiting term, such as "just," "immediate(ly)," or "direct(ly)," is used. In construing an element, the element is to be construed as including an error or tolerance range even where no explicit description of such an error or tolerance range is provided. Further, the term "may" fully encompasses all the meanings of the term "can."

The term "at least one" should be understood as including any or all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

The expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

Hereinafter, various example embodiments of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

Hereinafter, with reference to the accompanying drawings, various embodiments of the present disclosure will be described in detail.

FIG. 1 illustrates an example pen touch system 10 according to embodiments of the present disclosure.

Referring to FIG. 1, in one or more example embodiments, the pen touch system 10 can recognize whether a touch is applied by a touch object and/or a location of the touch (or touch coordinates). Thereafter, the pen touch system 10 can obtain touch event information in accordance with the applied touch and/or the touch location, and thereafter, display an image (e.g., a still image or video image) corresponding to the obtained touch event information or the touch location on a screen, or perform an action corresponding to the obtained touch event information or touch location.

Referring to FIG. 1, in one or more example embodiments, the pen touch system 10 may include a display device 100 and a pen 110.

For example, a touch object detectable by the pen touch system 10 may basically include the pen 110 and may further include a finger, and the like. The touch event information may be information indicating that a touch has occurred, or may be information on a touch type such as a tap type (which may be also referred to as a click type), a double click type, a drag and drop type, a touch hold type, and the like.

Referring to FIG. 1, in one or more embodiments, the pen touch system 10 can recognize (or detect or sense) a touch by the pen 110 based on an optical technique. In one or more aspects, the pen touch system 10 may use light having one or more wavelengths included in a specific wavelength band to perform pen touch sensing based on such an optical technique (hereinafter, which may be referred to as an optical pen touch sensing).

One or more wavelengths of light emitted from light emitting elements for image display may be included in a first wavelength band (e.g., a visible light wavelength band). One or more wavelengths of light used for optical pen touch sensing may be included in a second wavelength band, which is a specific wavelength band. Herein, one or more wavelengths of light emitted from light emitting elements for image display are referred to as a first wavelength, which is included in the first wavelength band. Further, one or more wavelengths of light used for pen touch sensing are referred to as a second wavelength, which is included in the second wavelength band.

The specific wavelength band used for optical pen touch sensing may be different from the first wavelength band (e.g., the visible light wavelength band) that includes one or more wavelengths of light emitted from light emitting elements for image display. Accordingly, the second wavelength included in the second wavelength band, which is the specific wavelength band used for optical pen touch sensing, may be different from the first wavelength included in the first wavelength band (e.g., the visible light wavelength band).

For example, the second wavelength band may be an infrared wavelength band. Light having the second wavelength may be infrared light having one or more wavelengths (the second wavelength) included in the infrared wavelength band (e.g., a wavelength range of approximately 780 nm to 1000 μm). In another example, the second wavelength band may be an ultraviolet wavelength band. Light having the second wavelength may be ultraviolet light having one or more wavelengths (the second wavelength) included in the ultraviolet wavelength band (e.g., a wavelength range of approximately 10 nm to 397 μm). One or more example embodiments of the present disclosure are not limited thereto. For example, the light having the second wavelength may be electromagnetic wave having various wavelengths. Hereinafter, for convenience of explanation, discussions are provided based on examples where the first wavelength band is the visible light wavelength band, the second wavelength band is the infrared wavelength band, the first wavelength is one or more visible light wavelengths, and the second wavelength is one or more infrared wavelengths. Accordingly, it is assumed that light having the first wavelength is visible light (including red light, green light, blue light, and the like), and light having the second wavelength is infrared light.

For example, the infrared wavelength band (e.g., approximately 780 nm to 1000 μm) may be classified into a near-infrared wavelength band (e.g., 750 nm to 3 μm), a mid-infrared wavelength band (e.g., 3 μm to 25 μm), and a far-infrared wavelength band (e.g., 25 μm to 1000 μm). In this example, the second wavelength may be included in the near-infrared wavelength band, or may also be included in the mid-infrared wavelength band or the far-infrared wavelength band. For example, the second wavelength band used for optical pen touch sensing may be the infrared wavelength band (e.g., 780 nm to 1000 μm), or may include one or more of the near-infrared wavelength band (e.g., 750 nm to 3 μm), the mid-infrared wavelength band (e.g., 3 μm to 25 μm), and the far-infrared wavelength band (e.g., 25 μm to 1000 μm).

In one or more aspects, the pen 110 of the pen touch system 10 can perform a light output function, a light reception function, a touch sensing function, a communication function, and the like.

The pen 110 can output light having the second wavelength as the light output function.

Depending on an inside structure of the display device 100, a part of light having the second wavelength output from the pen 110 may be absorbed at an inside of the display device 100, and another part of the light having the second wavelength output from the pen 110 may be reflected or converted into light having one or more other wavelengths at an inside of the display device 100, and redirected or radiated to move outside of the display device 100.

As the light reception function, the pen 110 can receive light (hereinafter, which may be referred to as redirected light) that, after having been reflected or converted into light having one or more wavelengths different from the second wavelength at an inside of the display device 100, is redirected to move outside of the display device 100 in the form of light having the second wavelength or the light having the one or more other wavelengths. Further, as the touch sensing function, the pen 110 can sense whether a touch (e.g., a touch input) has been applied and/or a location of the touch (touch coordinates) based on information on a distribution, a shade difference, and/or a wavelength difference of the redirected light detected based on the received redirected light.

The pen 110 can, as the communication function, communicate with the display device 100 by a predetermined communication method, and transmit sensing data including whether a touch (e.g., a touch event or touch input) has been applied and/or a location of the touch to the display device 100. For example, the sensing data may include touch event information and/or touch coordinate data. For example, the touch event information may be information indicating that a touch has occurred, or may be information on a touch type such as a tap type (click type), a double click type, a drag and drop type, a touch hold type, and the like. The touch coordinate data may be information on coordinates of a touch location.

As described above, depending on an inside structure of the display device 100, a part of light having the second wavelength output from the pen 110 may be absorbed at an inside of the display device 100, and another part of the light having the second wavelength output from the pen 110 may be, at an inside of the display device 100, reflected or converted into light having one or more wavelengths and radiated in the form of the light having one or more other wavelengths, and thereafter, redirected to move outside of display device 100.

Hereinafter, in one or more example embodiments, the display device 100 and the pen 110 included in the pen touch system 10 are described in more detail with reference to FIGS. 2, 3A, and 3B.

Figure 2:
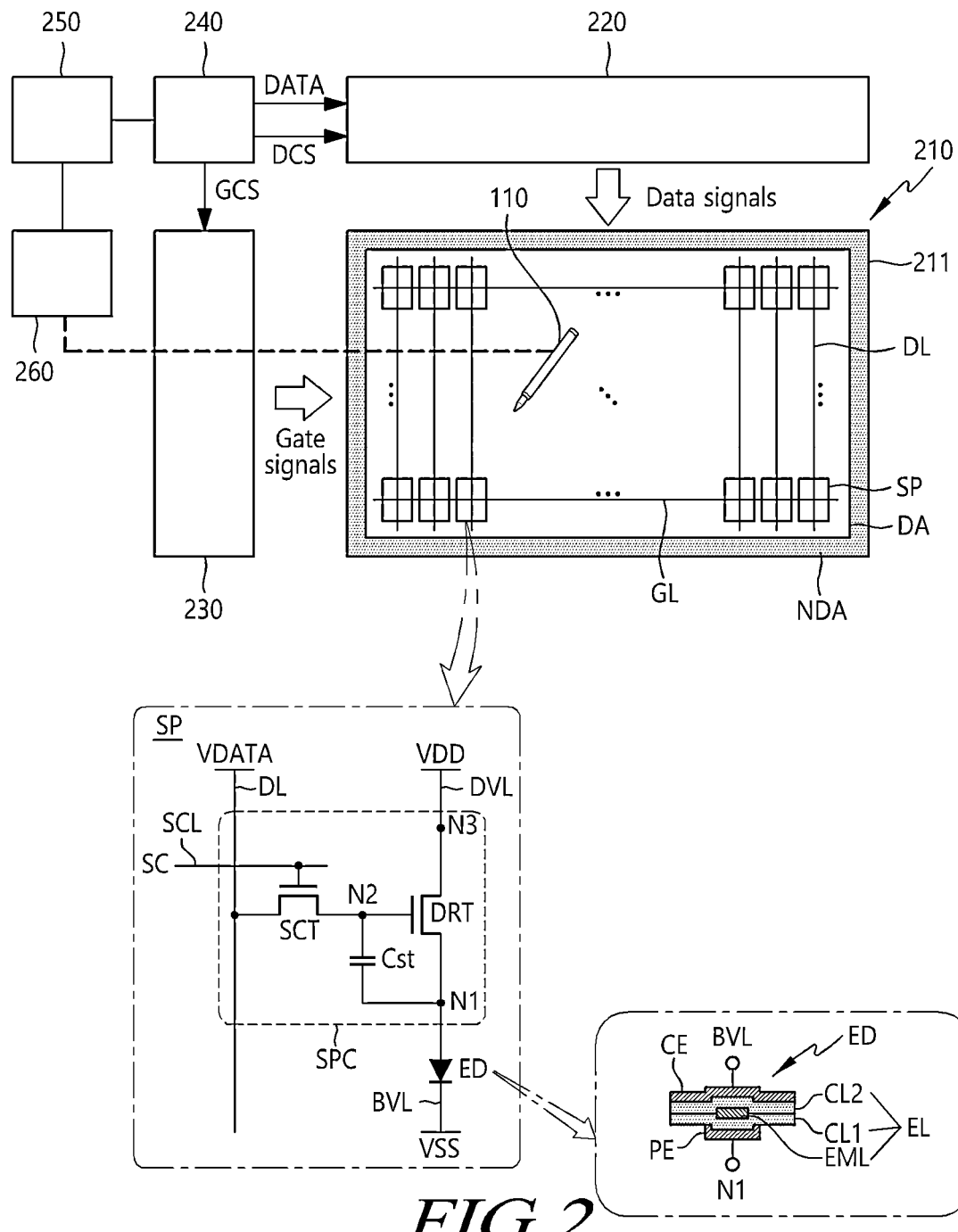
FIG. 2 illustrates an example display device according to embodiments of the present disclosure.

FIG. 2 illustrates an example display device 100 according to embodiments of the present disclosure. FIGS. 3A and 3B illustrate an example pen 110 according to embodiments of the present disclosure.

Referring to FIG. 2, in one or more example embodiments, the display device 100 may include a display panel 210 and a display driving circuit as components for displaying an image. The display driving circuit may be a circuit for driving the display panel 210, and include a data driving circuit 220, a gate driving circuit 230, and a controller 240. In one or more aspects, the display driving circuit may further include a host system 250.

The display panel 210 may include a first substrate 211, a plurality of subpixels SP disposed on the first substrate 211, and various types of signal lines disposed on the first substrate 211 and configured to drive the plurality of subpixels SP.

The first substrate 211 may include a display area DA where a plurality of subpixels SP are disposed and a non-display area NDA located outside of the display area DA.

The non-display area NDA may include a pad area to which the data driving circuit 220 is connected. For example, the pad area may be located in a first direction in the non-display area NDA. The first direction may be, for example, a column direction or a row direction.

The non-display area NDA may have a minimal size allowing only the pad area, and the like to be included. In one or more aspects, the non-display area NDA of the display panel 210 may have a very small area. For example, even when the display panel 210 has the non-display area NDA, a boundary area between the display area DA and the non-display area NDA may be bent, and thereby the non-display area NDA may be located under the display area DA. In this example, when a user views the display device 100 in front thereof, all or most of the non-display area NDA may not be visible to the user.

In one or more embodiments, the display device 100 may be a liquid crystal display device, or the like, or a self-emission display device in which light is emitted from the display panel 210 itself. In an example where the display device 100 is a self-emission display device, each of the plurality of subpixels SP may include a light emitting element ED.

For example, the display device 100 according to aspects of the present disclosure may be an organic light emitting display device in which the light emitting element ED is implemented using an organic light emitting diode (OLED). In another example, the display device 100 according to embodiments of the present disclosure may be an inorganic light emitting display device in which the light emitting element ED is implemented using an inorganic material-based light emitting diode. In further another example, the display device 100 according to aspects of the present disclosure may be a quantum dot display device implemented with quantum dots, which are self-emission semiconductor crystals, as light emitting elements ED.

The structure of each of the plurality of subpixels SP may depend on types of display device 100. For example, when the display device 100 is a self-emission display device including self-emission subpixels SP, each subpixel SP may include a self-emission light emitting element ED and a subpixel circuit SPC configured to drive the light emitting element ED.

The various types of signal lines may include, for example, a plurality of data lines DL for carrying data signals (which may be referred to as data voltages or image signals), a plurality of gate lines GL for carrying gate signals (which may be referred to as scan signals), and the like. The various types of signal lines may further include at least one signal line for delivering a display driving voltage (e.g., a common voltage) different from the data signals and the gate signals.

In one or more embodiments, the plurality of data lines DL and the plurality of gate lines GL may intersect one another. Each of the plurality of data lines DL may be con figured to extend in a first direction, and each of the plurality of gate lines GL may be con figured to extend in a second direction. For example, the first direction may be the column or vertical direction, and the second direction may be the row or horizontal direction. In another example, the first direction may be the row or horizontal direction, and the second direction may be the column or vertical direction. Hereinafter, discussions are provided based on examples where the first direction is the column direction and the second direction is the row direction.

The data driving circuit 220 may be a circuit for driving a plurality of data lines DL and can output data signals to the plurality of data lines DL.

The data driving circuit 220 can receive image data DATA in digital form from the controller 240, convert the received image data DATA into data signals in analog form, and output the resulting data signals to the plurality of data lines DL.

In one or more embodiments, the data driving circuit 220 may be connected to the display panel 210 by a tape-automated-bonding (TAB) technique, or connected to a conductive pad such as a bonding pad of the display panel 210 by a chip-on-glass (COG) technique or a chip-on-panel (COP) technique, or connected to the display panel 210 by a chip-on-film (COF) technique.

The data driving circuit 220 may be disposed outside of the display area DA of the display panel 210, or be disposed in the display area DA of the display panel 210.

The gate driving circuit 230 may be a circuit for driving a plurality of gate lines GL and can output gate signals to the plurality of gate lines GL.

The gate driving circuit 230 can receive various types of gate driving control signals GCS, and further, receive a first gate voltage corresponding to a turn-on level voltage and a second gate voltage corresponding to a turn-off level voltage. Thereby, the gate driving circuit 230 can generate gate signals and supply the generated gate signals to the plurality of gate lines GL.

In one or more embodiments, the gate driving circuit 230 included in the display device 100 may be disposed in the non-display area NDA. In one or more embodiments, the gate driving circuit 230 may be configured to overlap with the display area DA of the display panel 210. For example, the gate driving circuit 230 may be disposed throughout the entire display area DA or may be disposed only in at least one partial area (e.g., one or more of both side edges) within the display area DA. In an example where the gate driving circuit 230 is configured to overlap with the display area DA, the gate driving circuit 230 may be configured not to overlap with subpixels SP, or be configured to overlap with one or more, or all, of the subpixels SP.

In one or more embodiments, the gate driving circuit 230 included in the display device 100 may be embedded into the display panel 210 by a gate-in-panel (GIP) technique. In an example where the gate driving circuit 230 is implemented by the gate-in-panel (GIP) technique, the gate driving circuit 230 may be disposed on the first substrate 211 of the display panel 210 during the manufacturing process of the display panel 210 or display device 100.

The controller 240 may be a device configured to receive image data and various display driving control signals from the host system 250, supply image data DATA corresponding to the received image signal to the data driving circuit 220, and control the data driving circuit 220 and the gate driving circuit 230.

The controller 240 can generate at least one data drive control signal DCS for controlling data driving and at least one gate drive control signal GCS for controlling gate driving by using display control signals (e.g., a vertical synchronous signal, a horizontal synchronous signal, a data enable signal, a clock signal, and the like) received from the host system 250.

The controller 240 can control the operation and driving timing of the data driving circuit 220 by supplying the at least one data driving control signal DCS to the data driving circuit 220.

The controller 240 can control the operation and driving timing of the gate driving circuit 230 by supplying the at least one gate driving control signal GCS to the gate driving circuit 230.

The controller 240 can receive image data input from the host system 250 and supply image data DATA readable by the data driving circuit 220 based on the input image data to the data driving circuit 220.

The controller 240 may be implemented in a separate component from the data driving circuit 220, or integrated with the data driving circuit 220, so that the controller 240 and the data driving circuit 220 can be implemented in a single integrated circuit.

The controller 240 may be a timing controller used in the display technology or a control device capable of additionally performing other control functionalities in addition to the function of the timing controller. In one or more aspects, the controller 240 may be one or more other control circuits different from the timing controller, or a circuit or component in the control device. The controller 240 may be implemented using various circuits or electronic components such as an integrated circuit (IC), a field programmable gate array (FPGA), an application specific integrated circuit (ASIC), a processor, and/or the like.

The controller 240 may be mounted on a printed circuit board, a flexible printed circuit, or the like, and may be electrically connected to the data driving circuit 220 and the gate driving circuit 230 through the printed circuit board, the flexible printed circuit, and/or the like. The controller 240 can transmit signals to, and receive signals from, the data driving circuit 220 via one or more predetermined interfaces.

For example, such interfaces may include a low voltage differential signaling (LVDS) interface, an embedded clock point-point interface (EPI), a serial peripheral interface (SPI), and the like.

In one or more aspects, to provide a touch sensing function, as well as an image display function, the display device 100 may include a touch sensor and a touch sensing circuit.

The touch sensing circuit can detect whether a touch (e.g., a finger touch, or a pen touch) has been applied by a touch object such as a finger, pen 110, or the like or detect a location of the touch by sensing the touch sensor. This touch sensing may be a touch sensing scheme different from optical pen touch sensing.

For example, the touch sensing circuit may include a touch driving circuit configured to drive and sense the touch sensor and generate and output touch sensing data, and a touch controller configured to detect the application of a touch or a touch location using the touch sensing data.

The touch sensor may include a plurality of sensor electrodes. The touch sensor may also be referred to as a touch panel or touch screen panel. The touch sensor may be an external type touch sensor configured to be located outside of the display panel 210 or an internal type touch sensor configured to be located inside of the display panel 210.

The display device 100 may further include a power supply circuit for supplying various types of power to the display driving circuit.

In some embodiments, the display device 100 may be a mobile terminal such as a smart phone, a tablet, or the like, or a monitor, a television (TV), or the like. Such devices may be configured in various types, sizes, and shapes. The display device 100 according to aspects of the present disclosure are not limited thereto, and may include various types, sizes, and shapes configured to display information or images.

Referring to FIG. 2, in an example where the display device 100 according to aspects of the present disclosure is a self-emission display device, each of the plurality of subpixels SP may include a light emitting element ED and a subpixel circuit SPC for driving the light emitting element ED.

The subpixel circuit SPC may include a plurality of pixel driving transistors and at least one capacitor for driving the light emitting element ED.

The subpixel circuit SPC may be connected to a data line DL, a gate line GL, a first driving voltage line DVL, and a second driving voltage line BVL.

The plurality of pixel driving transistors may include a driving transistor DRT configured to actually drive the light emitting element ED by supplying a driving current to the light emitting element ED, and a scan transistor SCT configured to allow a data signal VDATA to be passed to a second node N2, which is the gate node of the driving transistor DRT.

The at least one capacitor may include a storage capacitor Cst configured to maintain a constant voltage during a display frame or a certain period of the display frame.

To drive one or more subpixels SP, at least one data signal VDATA, which is an image signal, and at least one scan signal SC, which is a gate signal, may be applied to one or more subpixels SP. Further, to drive one or more subpixels SP, common driving voltages including a first driving voltage VDD and a second driving voltage VSS may be applied to the subpixels SP.

The light emitting element ED may include a pixel electrode PE, an element intermediate layer EL, and a common electrode CE. The pixel electrode PE may be an electrode disposed in each subpixel SP, and the common electrode CE may be an electrode commonly disposed in all or some of a plurality of subpixels SP. The element intermediate layer EL may be a layer disposed between the pixel electrode PE and the common electrode CE, and may include an emission layer EML.

In an example where the light emitting element ED is an organic light emitting element such as an organic light emitting diode (OLED), the element intermediate layer EL may include the emission layer EML, a first common layer CL1 between the pixel electrode PE and the emission layer EML, and a second common layer CL2 between the emission layer EML and the common electrode CE. The emission layer EML may be disposed in each subpixel SP, and the first common layer CL1 and the second common layer CL2 may be commonly disposed in all or some of a plurality of subpixels SP. The emission layer EML may be disposed in each light emitting area. The first common layer CL1 and the second common layer CL2 may be disposed in corresponding light emitting areas of all or some of the plurality of subpixels SP, and further extend to a non-light emitting area. Each light emitting element ED may be configured by a portion where a corresponding pixel electrode PE, a corresponding emission layer EML, respective corresponding portions of the first common layer CL1 and the second common layer CL2, and a corresponding portion of the common electrode CE overlap with each other. A corresponding light emitting area may be formed by each light emitting element ED. That is, a corresponding light emitting area of each light emitting element ED may include an area where a corresponding pixel electrode PE, a corresponding element intermediate layer EL, and the common electrode CE overlap with each other.

For example, the pixel electrode PE may be an anode, and the common electrode CE may be a cathode. In another example, the pixel electrode PE may be a cathode, and the common electrode CE may be an anode.

For example, the common electrode CE may be electrically connected to the second driving voltage line BVL. The second driving voltage VSS, which is a type of common driving voltage, may be applied to the common electrode CE through the second driving voltage line BVL. The pixel electrode PE may be electrically connected to one node of a transistor (e.g., a first node N1 of the driving transistor DRT) included in a corresponding subpixel circuit SPC of each subpixel SP.

The driving transistor DRT may be a transistor configured to supply a driving current to the light emitting element ED. The driving transistor DRT may be connected between the first driving voltage line DVL and the light emitting element ED.

The driving transistor DRT may include a first node N1 electrically connected with the light emitting element ED, a second node N2 to which a data signal VDATA is applied, and a third node N3 to which a driving voltage VDD through the first driving voltage line DVL is applied.

In the driving transistor DRT, the second node N2 may be a gate node, the first node N1 may be a source node or a drain node, and the third node N3 may be the drain node or the source node. Hereinafter, for merely convenience of explanation, discussions may be provided based on examples where the first, second, and third nodes (N1, N2, and N3) of the driving transistor DRT are source, gate, and drain nodes, respectively. However, example embodiments of the present disclosure are not limited thereto.

The scan transistor SCT may be a switching transistor for allowing a data signal VDATA, which is an image signal, to be passed to the second node N2, which is the gate node of the driving transistor DT.

The scan transistor SCT can be turned on or turned off by a scan signal SC, which is a type of gate signal, carried by a scan line SCL, which is a type of gate line GL, and control an electrical connection between the second node N2 of the driving transistor DRT and a data line DL. The drain electrode or source electrode of the scan transistor SCT may be electrically connected to the data line DL. The source electrode or drain electrode of the scan transistor SCT may be electrically connected to the second node N2 of the driving transistor DRT. The gate electrode of the scan transistor SCT may be electrically connected to the scan line SCL.

The storage capacitor Cst may be electrically connected between the first node N1 and the second node N2 of the driving transistor DRT. The storage capacitor Cst may include a first capacitor electrode electrically connected to the first node N1 of the driving transistor DRT or corresponding to the first node N1 of the driving transistor DRT, and a second capacitor electrode electrically connected to the second node N2 of the driving transistor DRT or corresponding to the second node N2 of the driving transistor DRT.

Each of the driving transistor DRT and the scan transistor SCT may be an n-type transistor or a p-type transistor.

For example, at least a portion of the subpixel circuit SPC may overlap with at least a portion of the light emitting element ED in the vertical direction. In another example, the subpixel circuit SPC may not overlap the light emitting element ED in the vertical direction. As shown in FIG. 2, the subpixel circuit SPC may include two transistors (2T: T1 and T2) and one capacitor (1C: Cst) (which may be referred to as a "2T1C structure"), and in some implementations, may further include one or more transistors, or further include one or more capacitors.

The types and number of gate signals supplied to a subpixel SP, and/or the types and number of gate lines connected to the subpixel SP may vary depending on a structure of a corresponding subpixel circuit SPC. Further, the types and number of common driving voltages supplied to a subpixel SP may vary depending on a structure of a corresponding subpixel circuit SPC.

Since circuit elements (e.g., a light emitting element ED such as an organic light emitting diode (OLED) including an organic material) in each subpixel SP are vulnerable to external moisture or oxygen, an encapsulation layer may be disposed at the display panel 210 to prevent the external moisture or oxygen from penetrating into the circuit elements (e.g., the light emitting element ED). The encapsulation layer may be disposed in various shapes or configurations to prevent light emitting elements ED from contacting moisture or oxygen.

Referring to FIG. 2, in one or more embodiments, the display device 100 may include a communication module 260 for communicating with the pen 110.

The communication module 260 of the display device 100 can receive sensing data (e.g., touch event information and/or touch coordinate data) from the pen 110. For example, the communication module 260 may include a hardware module (e.g., a circuit) and a software module for communication.

Referring to FIG. 2, the host system 250 or the controller 240 can determine a touch location based on the sensing data received by the communication module 260 and perform an operation corresponding to the determined touch location. For example, the host system 250 or the controller 240 can perform operation of selecting an object (e.g., an icon, and the like) displayed at the touch location, and supply, to the controller 240 or the data driving circuit 220, input image data for displaying an image to be presented according to the selection of the object on the display panel 210. In another example, the host system 250 or the controller 240 can perform operation of selecting an object (e.g., an icon, and the like) displayed at the touch location and execute an application corresponding to the selected object.

Figure 3A:
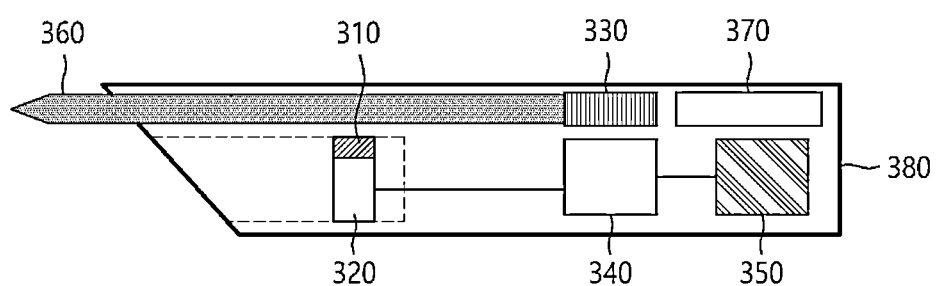
FIGS. 3A and 3B illustrate an example pen according to embodiments of the present disclosure.
Figure 3B:
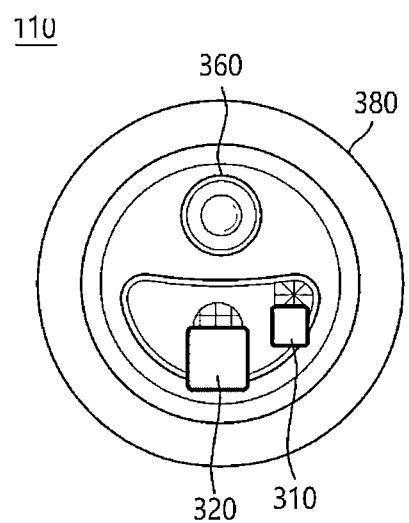

Referring to FIGS. 3A and 3B, in one or more example embodiments, the pen 110 included in the pen touch system 10 may include a light emitting device 310, a light receiving sensor 320, a control processor 340, and a communication device 350, a pen tip 360, and a case 380.

The pen tip 360 may be an element for contacting the display device 100.

The light emitting device 310 can emit light having the second wavelength. For example, the light having the second wavelength may be infrared light. In this example, the light emitting device 310 may include an infrared light emitting diode package.

The light receiving sensor 320 can receive and sense redirected light coming from the display panel 210. The redirected light coming from the display panel 210 may be light that has been reflected at an inside of the display panel 210 among the light having the second wavelength emitted from the light emitting device 310. For example, the light receiving sensor 320 may be implemented with a complementary metal-oxide semiconductor (CMOS). The light receiving sensor 320 may also be referred to as an image sensor or a camera. In an example where the light having the second wavelength emitted from the light emitting device 310 is infrared light, the light receiving sensor 320 (which may also be referred to as an infrared image sensor or an infrared camera) can receive and sense redirected light coming from the display panel 210 and generate an infrared image.

The control processor 340 can control and manage the overall operation and state of the pen 110, and can control the operations of the light emitting device 310, the light receiving sensor 320, and the communication device 350. The control processor 340 can generate sensing data by determining whether a touch has been applied and/or a location of the touch based on a distribution, a shade difference, or a wavelength difference of the redirected light received and sensed by the light receiving sensor 320.

The communication device 350 can communicate with the communication module 260 of the display device 110. The communication device 350 can transmit the sensing data (e.g., touch event information and/or touch coordinate data) generated by the control processor 340 to the communication module 260 of the display device 100. For example, the communication device 350 may include a hardware module and a software module for short-range wireless communication. For example, short-range wireless communication may include Bluetooth, wireless LAN, and the like.

The communication device 350 of the pen 110 and the communication module 260 of the display device 100 can communicate according to a predefined communication protocol.

In one or more embodiments, the pen 110 may further include a pressure sensor 330 for detecting a pressure with which the pen tip 360 presses the display device 100. The pressure sensor 330 may be connected to a portion of the pen tip 360 and can detect a pressure with which the pen tip 360 presses the display device 100.

The case 380 may accommodate the light emitting device 310, the light receiving sensor 320, the pressure sensor 330, the control processor 340, the communication device 350, the pen tip 360 and the battery 370.

In one or more aspects, the pen 110 may include a power source such as a battery 370 for supplying power to the light emitting device 310, the light receiving sensor 320, the pressure sensor 330, the control processor 340, the communication device 350, and the like. The battery 370 may be a wired or wireless rechargeable battery.

The case 380 may accommodate the light emitting device 310, the light receiving sensor 320, the pressure sensor 330, the control processor 340, the communication device 350, and the pen tip 360.

Figure 4:
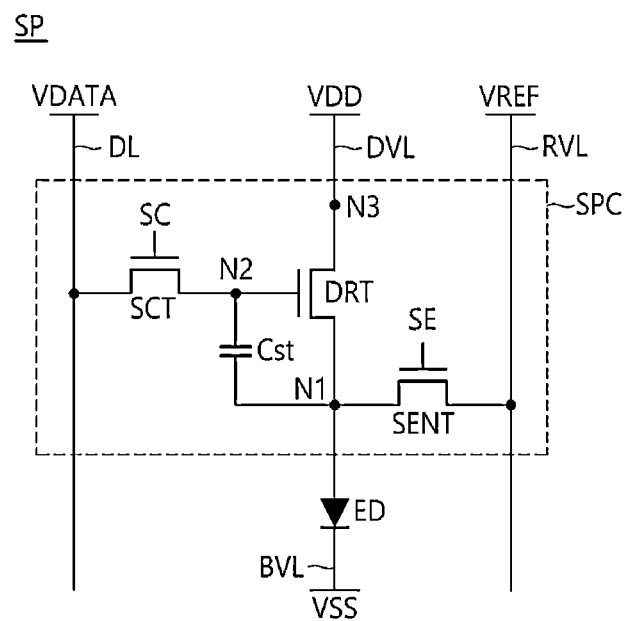
FIG. 4 illustrates an example equivalent circuit of a subpixel included in the display device according to embodiments of the present disclosure.

FIG. 4 illustrates an example equivalent circuit of a subpixel SP included in the display device 100 according to aspects of the present disclosure.

Referring to FIG. 4, each of a plurality of subpixels SP may include a light emitting element ED and a subpixel circuit SPC configured to drive the light emitting element ED. The subpixel circuit SPC of the subpixel SP illustrated in FIG. 4 may further include a sensing transistor SENT compared with the subpixel circuit SPC of the subpixel SP illustrated in FIG. 2. Hereinafter, discussions on the subpixel SP of FIG. 4 are provided by focusing on features different from the subpixel SP of FIG. 2. Thus, discussions on the same features as the subpixel SP of FIG. 2 are omitted for convenience of discussions.

Referring to FIG. 4, the subpixel circuit SPC may be connected to a data line DL, a gate line GL, a first driving voltage line DVL, a second driving voltage line BVL, and a reference voltage line RVL.

A plurality of pixel driving transistors may include a sensing transistor SENT in addition to a driving transistor DRT and a scan transistor SCT.

The sensing transistor SENT may be a transistor for controlling a voltage state of a first node N1 of the driving transistor DRT, and be connected between the first node N1 of the driving transistor DRT and the reference voltage line RVL.

The sensing transistor SENT can be turned on or turned off by a sensing signal SE, which is another type of gate signal, applied through a sensing line SENL, which is another type of gate line GL, and control an electrical connection between the first node N1 of the driving transistor DRT and the reference voltage line RVL through which a reference voltage VREF is delivered.

The drain electrode or source electrode of the sensing transistor SENT may be electrically connected to the reference voltage line RVL. The source electrode or drain electrode of the sensing transistor SENT may be connected to the first node N1 of the driving transistor DRT, and the gate electrode of the sensing transistor SENT may be electrically connected to the sensing line SENL.

Referring to FIG. 4, the scan signal SC may be referred to as a first scan signal, and the sensing signal SE may be referred to as a second scan signal. In this implementation, the scan transistor SCT may be referred to as a first scan transistor, and the sensing transistor SENT may be referred to as a second scan transistor.

Each of the driving transistor DRT, the scan transistor SCT, and the sensing transistor SENT may be an n-type transistor, or a p-type transistor.

In one or more embodiments, each of the plurality of subpixels SP may have a structure different from the structures (i.e., the equivalent circuits) of FIGS. 2 and 4. It should be noted that convenience of explanation, hereinafter, discussions are provided based on examples where each of a plurality of subpixels SP has the structure (i.e., the equivalent circuit) of FIG. 4.

Figure 5:
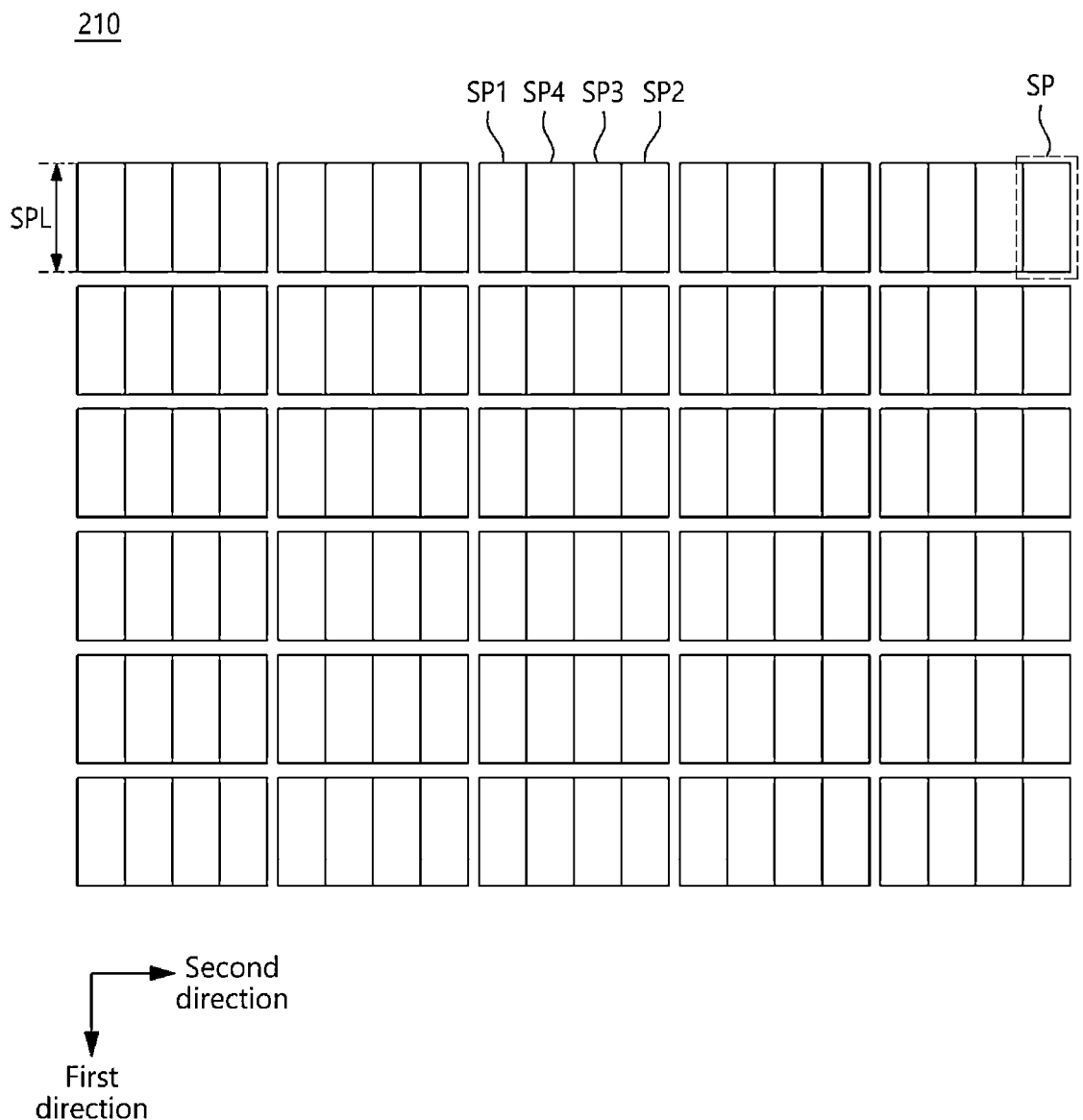
FIG. 5 is an example plan view of a display panel according to embodiments of the present disclosure.

FIG. 5 is an example plan view of the display panel 210 according to embodiments of the present disclosure.

Referring to FIG. 5, in one or more embodiments, the display panel 210 may include a plurality subpixel array areas SPL. Each of the plurality of subpixel array areas SPL may include a plurality of subpixels SP.

For example, the plurality of subpixel array areas SPL may be disposed adjacent to each other in a first direction. The plurality of subpixels SP included in each of the plurality of subpixel array areas SPL may be disposed adjacent to each other in a second direction. For example, the first direction may be a column direction and the second direction may be a row direction. In another example, the first direction may be the row direction and the second direction may be the column direction. Hereinafter, for merely convenience of explanation, discussions are provided based on examples where the first direction is the column direction and the second direction is the row direction.

The plurality of subpixels SP may include a plurality of first subpixels SP1 emitting first color light, a plurality of second subpixels SP2 emitting second color light, and a plurality of third subpixels SP3 emitting third color light.

The first color light may have a first color wavelength included in a first wavelength band.

The second color light may have a second color wavelength included in the first wavelength band.

The third color light may have a third color wavelength included in the first wavelength band.

The plurality of subpixels SP may further include a plurality of fourth subpixels SP4 emitting fourth color light.

The fourth color light may have a fourth color wavelength included in the first wavelength band.

For example, the first wavelength band may be a visible light wavelength band.

For example, the first color wavelength may be a red wavelength, and the first color light may be red light. The second color wavelength may be a green wavelength, and the second color light may be green light. The third color wavelength may be a blue wavelength, and the third color light may be blue light. The fourth color wavelength may be a white wavelength, and the fourth color light may be white light. Hereinafter, for convenience of explanation, discussions are provided based on examples where the first color light is red light, the second color light is green light, the third color light is blue light, and the fourth color light is white light.

Figure 6:
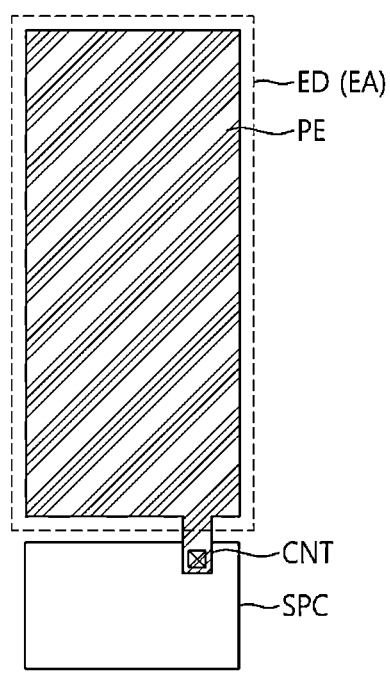
FIG. 6 is an example plan view of a subpixel in an example where the display panel has a bottom emission structure according to embodiments of the present disclosure.

FIG. 6 illustrates an example plan view of a subpixel SP in an example where the display panel 210 has a bottom emission structure according to aspects of the present disclosure.

Referring to FIG. 6, as described above, each subpixel SP may include a light emitting element ED and a subpixel circuit SPC for controlling light emitting of the light emitting element ED.

In an example where the display panel 210 has the bottom emission structure, a corresponding light emitting element ED and a corresponding subpixel circuit SPC included in each subpixel SP may be configured not to overlap with each other.

A light emitting area EA may be formed by the light emitting element ED. An area of the light emitting element ED and an area of the light emitting area EA may be the same or substantially the same.

A portion of the pixel electrode PE of the light emitting element ED may be located outside of the light emitting area EA. The portion of the pixel electrode PE located outside of the light emitting area EA may be a portion for connection with the subpixel circuit SPC and may include a contact portion CNT connected to the subpixel circuit SPC.

Figure 7:
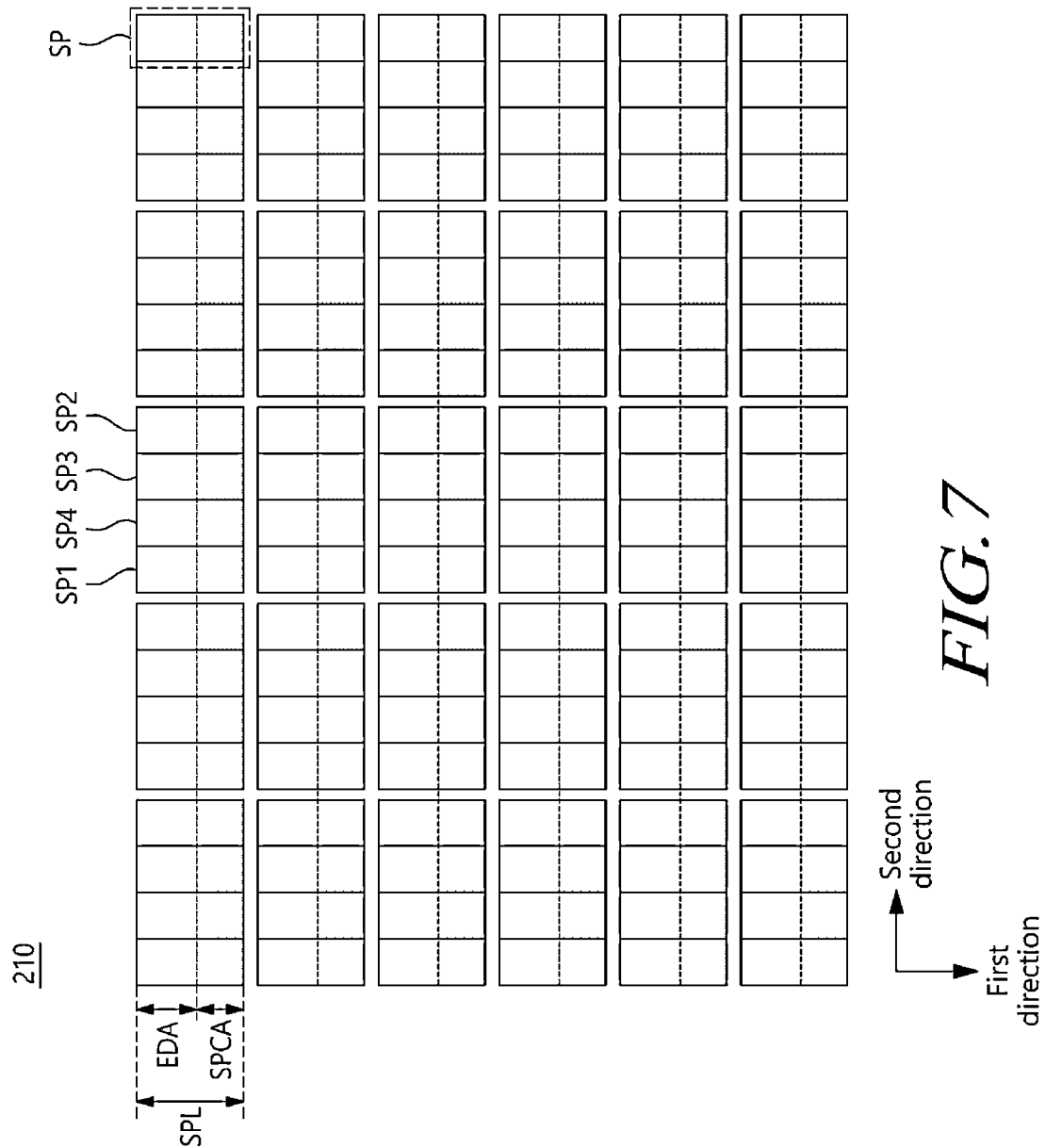
FIG. 7 is an example plan view of the display panel having the bottom emission structure according to embodiments of the present disclosure.

FIG. 7 is an example plan view of the display panel 210 having the bottom emission structure according to embodiments of the present disclosure.

Referring to FIG. 7, in one or more aspects, the display panel 210 may include a plurality subpixel array areas SPL. Each of the plurality of subpixel array areas SPL may include a plurality of subpixels SP.

In an example where the display panel 210 has the bottom emission structure, each of the plurality of subpixel array areas SPL may include a light emitting element array area EDA and a subpixel circuit array area SPCA.

The light emitting element array area EDA and the subpixel circuit array area SPCA may be configured not to overlap with each other. The light emitting element array area EDA and the subpixel circuit array area SPCA may be disposed adjacent to each other in the second direction.

For example, a plurality of light emitting elements ED may be disposed in the second direction in the light emitting element array area EDA. A plurality of subpixel circuits SPC may be disposed in the second direction in the subpixel circuit array area SPCA.

The plurality of subpixels SP may include a plurality of first subpixels SP1 emitting first color light, a plurality of second subpixels SP2 emitting second color light, and a plurality of third subpixels SP3 emitting third color light.

As described above, in one or more embodiments, for pen touch sensing, the pen 110 of the pen touch system 10 can emit light having the second wavelength included in the second wavelength band, and the light having the second wavelength emitted from the pen 110 may be incident on the display panel 210 of the display device 100. A part of the light having the second wavelength incident on the display panel 210 may be absorbed at an inside of the display panel 210, and another part of the light having the second wavelength may be reflected or converted into light having one or more other wavelengths at an inside of the display panel 210, and caused to move outside of the display panel 210 as redirected light in the form of the light having the second wavelength or light having the one or more other wavelengths.

Herein, the term "redirected light" may be reflected light or radiated light according to one embodiment. The reflected light may be, among light having the second wavelength emitted from the pen 110, some light that is reflected at an inside of the display device 100 after being incident to the display device 100, and redirected to move outside of the display device 100. The radiated light may be, among light having the second wavelength emitted from the pen 110, some light that is converted into light having one or more other wavelengths at an inside of the display device 100 after being incident to the display device 100, and radiated to move, in the form of the light having the one or more other wavelengths, outside of the display device 100.

Accordingly, at a certain point of the display panel 210, redirected light (reflected light, radiated light) may be caused to move outside of the display panel 210, but at another point of the display panel 210, light having the second wavelength may be absorbed, and therefore, redirected light may not be caused. The pen 110 can detect a touch location of the pen 110 by sensing a distribution, a shade difference, and/or a wavelength difference of redirected light (reflected light and/or radiated light) coming from the display panel 210.

In one or more embodiments, the display panel 210 of the display device 100 may include a light control structure configured to cause a part of light having the second wavelength incident to an inside of the display panel 210 after being output from the pen 110 to be reflected or converted into light having one or more other wavelengths and radiated in the form of the light having the one or more other wavelengths, thereby, leading resulting redirected light (i.e., reflected light or the radiated light) to come from the display device 100.

In one or more embodiments, the light control structure of the display panel 210 of the display device 100 may include two or more of an absorption structure configured to absorb light having the second wavelength, a reflection structure configured to reflect light having the second wavelength, and a radiation structure configured to convert light having the second wavelength into light having one or more other wavelengths and radiate the light having one or more other wavelengths.

The absorption structure can absorb light having the second wavelength (e.g., the infrared light) included in the second wavelength band. The absorption structure absorbing the light having the second wavelength may cause a shade difference in the distribution of redirected light (reflected light and/or radiated light) received by the pen 110.

The absorption structure may not absorb light having the first wavelength (e.g., the visible light) included in the first wavelength band (e.g., the visible light wavelength band) or may absorb a small amount of the light having the first wavelength. For example, the absorption structure can absorb light having the second wavelength included in the second wavelength band (e.g., the infrared wavelength band) not overlapping with the first wavelength band (e.g., the visible light wavelength band).

The reflection structure can reflect light having the second wavelength included in the second wavelength band without changing the wavelength. Redirected light (reflected light) reflected by the reflection structure may be received by the pen 110.

The radiation structure can convert light having the second wavelength into light having one or more other wavelengths and radiate the light having the one or more other wavelengths. The radiation structure may cause a wavelength difference of redirected light (radiated light) received by the pen 110.

For example, one or more other wavelengths converted from the second wavelength by the radiation structure may be included in the second wavelength band (e.g., the infrared wavelength band, or more specifically, the near-infrared wavelength band) including the second wavelength. In another example, one or more other wavelengths converted from the second wavelength by the radiation structure may be included in a wavelength band different from the second wavelength band (e.g., the infrared wavelength band) including the second wavelength.

Hereinafter, a light control structure of the display panel 210 of the display device 100 according to one or more example embodiments of the present disclosure is described.

Figure 8:
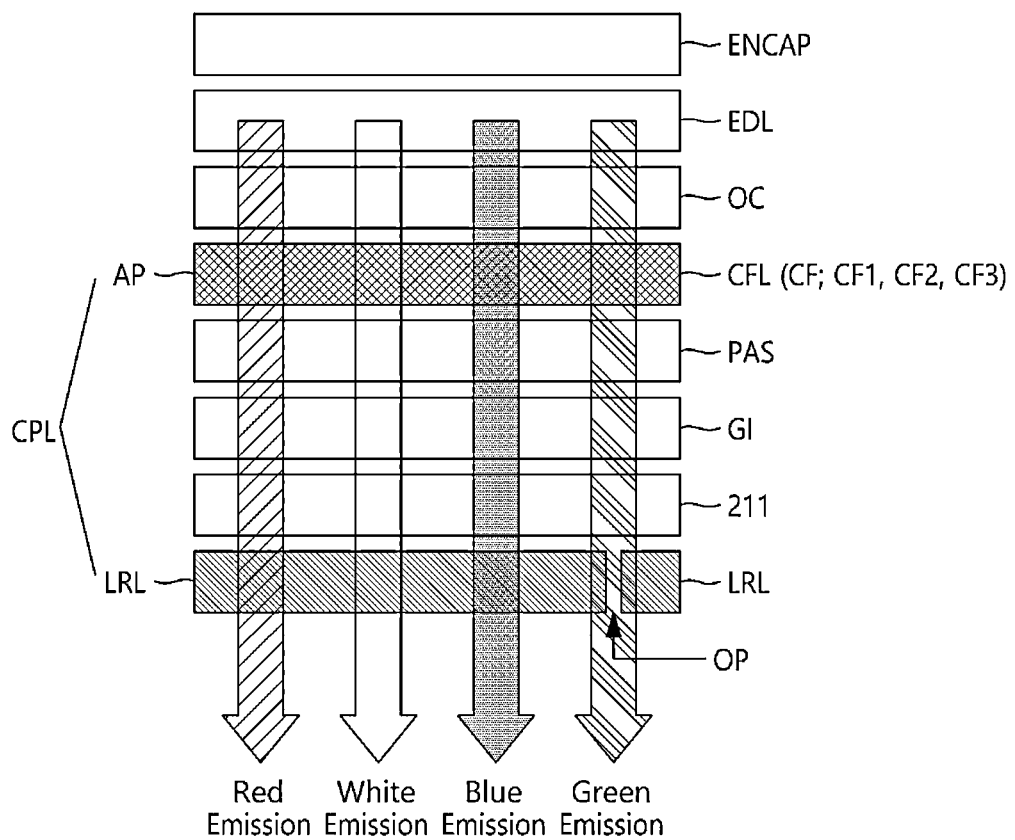
FIGS. 8 and 9 are example cross-sectional views of the display panel having the bottom emission structure according to embodiments of the present disclosure.
Figure 9:
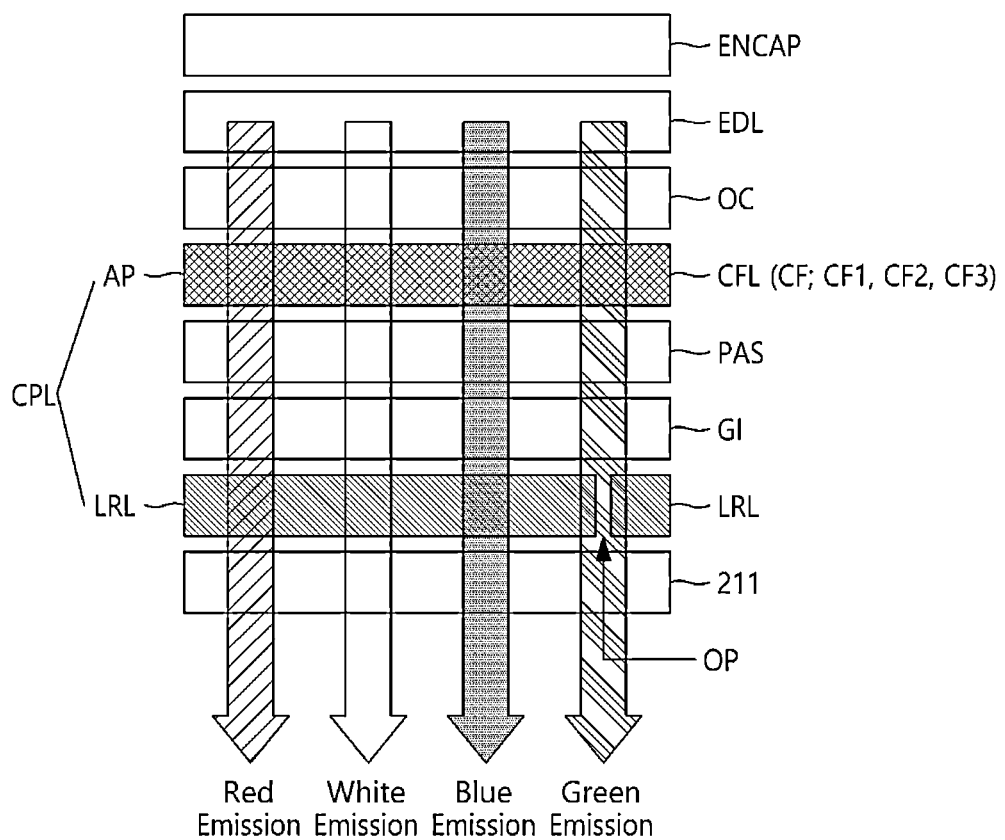

FIGS. 8 and 9 are example cross-sectional views of the display panel 210 having the bottom emission structure according to embodiments of the present disclosure.

Referring to FIGS. 8 and 9, in one or more example embodiments, the display panel 210 of the display device 100 may include a first substrate 211, a color filter layer CFL, and a photoactive layer LRL.

Referring to FIGS. 8 and 9, the color filter layer CFL may include a plurality of color filters CF. The plurality of color filters CF may transmit light having the first wavelength included in the first wavelength band.

Referring to FIGS. 8 and 9, the photoactive layer LRL may be responsive to light having the second wavelength included in the second wavelength band different from the first wavelength band. For example, such response to light having the second wavelength may include reflection, radiation, and the like. In the example of reflection as response for light having the second wavelength, the photoactive layer LRL may reflect the light having the second wavelength. In the example of radiation as response for light having the second wavelength, the photoactive layer LRL may convert light having the second wavelength into light having one or more other wavelengths and radiate the light having the one or more other wavelengths.

Referring to FIGS. 8 and 9, as light having the second wavelength or light having one or more other wavelengths comes from the display device 100, the pen 110 can receive the light having the second wavelength or the light having one or more other wavelengths coming from the display device 100 and output sensing data to the display device 100.

Referring to FIGS. 8 and 9, the plurality of color filters CF may include a plurality of first color filters CF1, a plurality of second color filters CF2, and a plurality of third color filters CF3.

The plurality of first color filters CF1 may be located in the color filter layer CFL and may transmit first color light having a first color wavelength included in the first wavelength band.

The plurality of second color filters CF2 may be located in the color filter layer CFL and may transmit second color light having a second color wavelength included in the first wavelength.

The plurality of third color filters CF3 may be located in the color filter layer CFL and may transmit third color light having a third color wavelength included in the first wavelength band.

Referring to FIGS. 8 and 9, the photoactive layer LRL may include two or more openings OP.

Referring to FIGS. 8 and 9, the two or more openings OP of the photoactive layer LRL may overlap with two or more color filters CF capable of transmitting light of a specific color. For example, the two or more openings OP may overlap with two or more second color filters CF2 capable of transmitting second color light among the plurality of second color filters CF2. For example, the two or more second color filters CF2 may be green color filters capable of transmitting green light. Hereinafter, for convenience of explanation, discussions are provided based on examples where two or more openings OP formed in the photoactive layer LRL overlap with two or more second color filters CF2 among the plurality of second color filters CF2.

Referring to FIGS. 8 and 9, light having the second wavelength incident on the display panel 210 may pass through two or more openings OP formed in the photoactive layer LRL and reach two or more second color filters CF2. The light having the second wavelength reaching the two or more second color filters CF2 may be absorbed by the two or more second color filters CF2.

Referring to FIGS. 8 and 9, a gate insulating layer GI may be located on the first substrate 211. A protective layer PAS may be located on the gate insulating layer GI. The color filter layer CFL may be located on the protective layer PAS.

Referring to FIGS. 8 and 9, an overcoat layer OC may be located on the color filter layer CFL. A light emitting element layer EDL may be located on the overcoat layer OC. An encapsulation layer ENCAP may be located on the light emitting element layer EDL.

Referring to FIGS. 8 and 9, the display panel 210 may include a code pattern layer CPL for pen touch sensing. The code pattern layer CPL may include the photoactive layer LRL and at least one absorption pattern AP. In one or more embodiments, the code pattern layer CPL may be a layer in which code patterns for pen touch sensing are formed or a layer for forming code patterns, and may also be referred to as a code pattern configuration layer.

Referring to FIGS. 8 and 9, at least one insulating layer (PAS and/or GI) may be disposed between the photoactive layer LRL and the absorption pattern AP included in the code pattern layer CPL.

The photoactive layer LRL may be a reflection structure configured to reflect light having the second wavelength or a radiation structure configured to convert light having the second wavelength into light having one or more other wavelengths and radiate the light having the one or more other wavelengths.

The at least one absorption pattern AP may be a structure configured to absorb light having the second wavelength.

In one or more embodiments, one or more absorption patterns AP included in the display panel 210 may be one or more of color filters of a specific color included in the color filter layer CFL, Here, the absorption patterns AP are not limited to the filter.

For example, among the plurality of first color filters CF1, the plurality of second color filters CF2, and the plurality of third color filters CF3, one or more of the plurality of second color filters CF2 may be used as one or more absorption patterns AP. For example, the second color light transmitted by the plurality of second color filters CF2 may be green light.

Referring to FIG. 8, the photoactive layer LRL may be located under the first substrate 211. The protective layer PAS, the gate insulating layer GI, and the first substrate 211 may be disposed between the photoactive layer LRL and the absorption pattern AP included in the code pattern layer CPL.

Referring to FIG. 9, the photoactive layer LRL may be located on or over the first substrate 211. For example, the photoactive layer LRL may be located between the first substrate 211 and the gate insulating layer GI. The protective layer PAS and the gate insulating layer GI may be disposed between the photoactive layer LRL and the absorption pattern AP included in the code pattern layer CPL.

Figure 10:
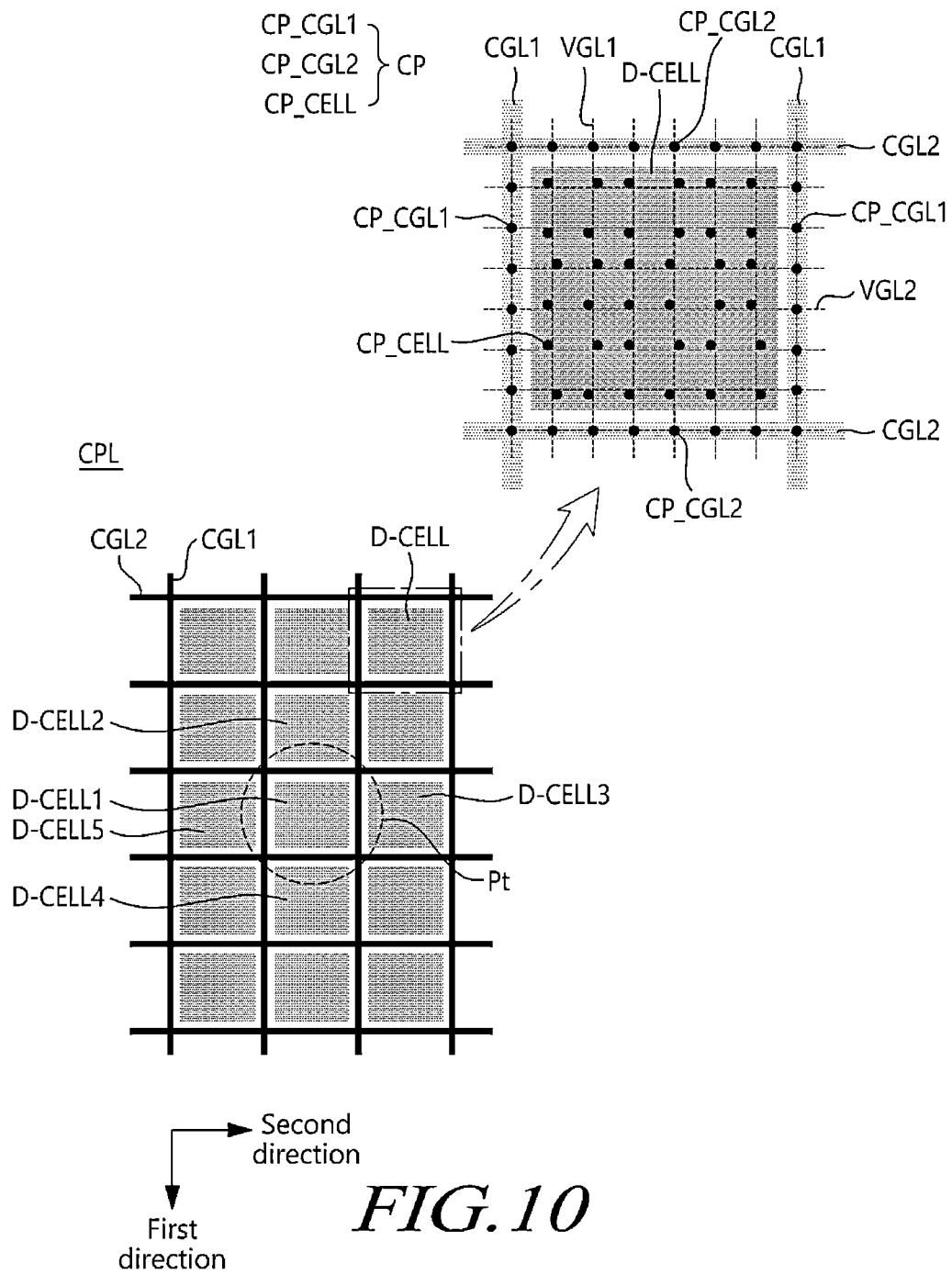
FIG. 10 illustrates an example configuration of code patterns in the display panel according to embodiments of the present disclosure.

FIG. 10 illustrates an example configuration of code patterns in the display panel 210 according to embodiments of the present disclosure.

Referring to FIG. 10, the code pattern layer CPL may include a plurality of data cell areas D-CELL arranged in rows and columns, a plurality of first cell guide lines CGL1, each of which is disposed between adjacent data cell areas D-CELL in the second direction, and a plurality of second cell guide lines CGL2, each of which is disposed between adjacent data cell areas D-CELL in the first direction.

Each of the plurality of first cell guide lines CGL1 may extend in the first direction, and each of the plurality of second cell guide lines CGL2 may extend in the second direction.

The code pattern layer CPL may include the plurality of data cell areas D-CELL arranged in rows and columns, the plurality of first cell guide lines CGL1, each of which is disposed between adjacent data cell areas D-CELL in the second direction, and the plurality of second cell guide lines CGL2, each of which is disposed between adjacent data cell areas D-CELL in the first direction.

Referring to FIG. 10, a plurality of code patterns CP may include a plurality of first guide code patterns CP_CGL1 for representing each of the plurality of first cell guide lines CGL1, a plurality of second guide code patterns CP_CGL2 for representing each of the plurality of second cell guide lines CGL2, and a plurality of data code patterns CP_CELL disposed in each of the plurality of data cell areas D-CELL and arranged in rows and columns.

Referring to FIG. 10, a pattern in which the plurality of data code patterns CP_CELL are arranged may be different for each of the plurality of data cell areas D-CELL.

The plurality of data code patterns CP_CELL included in each of the plurality of data cell areas D-CELL may be arranged in a matrix pattern of m rows and n columns.

In each of the plurality of data cell areas D-CELL, the plurality of data code patterns CP_CELL may be arranged along virtual grid lines (VGL1, VGL2) in m rows and n columns.

Each of the plurality of data cell areas D-CELL may correspond to one coordinate data. A pattern of locations where the plurality of data code patterns CP_CELL included in each of the plurality of data cell areas D-CELL are respectively disposed may represent one coordinate data. According to this configuration, the plurality of data code patterns CP_CELL are arranged in m rows and n columns in each of the plurality of data cell areas D-CELL, but at least one or more of locations where the plurality of data code patterns CP_CELL are respectively disposed may be slightly different for each of the plurality of data cell areas D-CELL.

The plurality of data code patterns CP_CELL included in each of the plurality of data cell areas D-CELL may have a unique arrangement shape (which may be also referred to as a unique disposition location pattern) corresponding to a unique coordinate pair.

A unique disposition location pattern of the plurality of data code patterns CP_CELL included in each of the plurality of data cell areas D-CELL may be an encrypted pattern representing a unique coordinate pair.

Referring to the example of FIG. 10, each of the plurality of data cell areas D-CELL may have, as a corresponding unique pattern, 36 data code patterns CP_CELL arranged in 6 rows and 6 columns to represent a unique coordinate pair using codes.

A first data cell area D-CELL1 may include 36 data code patterns CP_CELL to represent first coordinates. A second data cell area D-CELL2 may include 36 data code patterns CP_CELL to represent second coordinates. A third data cell area D-CELL3 may include 36 data code patterns CP_CELL to represent third coordinates. A fourth data cell area D-CELL4 may include 36 data code patterns CP_CELL to represent fourth coordinates. A fifth data cell area D-CELL5 may include 36 data code patterns CP_CELL to represent fifth coordinates.

A disposition location pattern of the 36 data code patterns CP_CELL included in the first data cell area D-CELL1 may be an encrypted pattern indicating first coordinates. A disposition location pattern of the 36 data code patterns CP_CELL included in the second data cell area D-CELL2 may be an encrypted pattern indicating second coordinates. A disposition location pattern of the 36 data code patterns CP_CELL included in the third data cell area D-CELL3 may be an encrypted pattern indicating third coordinate. A disposition location pattern of the 36 data code patterns CP_CELL included in the fourth data cell area D-CELL4 may be an encrypted pattern indicating fourth coordinates. A disposition location pattern of the 36 data code patterns CP_CELL included in the fifth data cell area D-CELL5 may be an encrypted pattern indicating fifth coordinates.

For example, the first coordinates corresponding to the first data cell area D-CELL1, the second coordinates corresponding to the second data cell area D-CELL2, the third coordinates corresponding to the third data cell area D-CELL3, the fourth coordinate corresponding to the fourth data cell area D-CELL4, and the fifth coordinate corresponding to the fifth data cell area D-CELL5 may be different from each other. Accordingly, the disposition location pattern of the 36 data code patterns CP_CELL included in the first data cell area D-CELL1, the disposition location pattern of the 36 data code patterns CP_CELL included in the second data cell area D-CELL2, the disposition location pattern of the 36 data code patterns CP_CELL included in the third data cell area D-CELL3, the disposition location pattern of the 36 data code patterns CP_CELL included in the fourth data cell area D-CELL4, and the disposition location pattern of the 36 data code patterns CP_CELL included in the 5th data cell area D-CELL5 may be different from each other.

Each of the plurality of data cell areas D-CELL may correspond to a corresponding portion of the display area DA. Each data cell area D-CELL may overlap with a group of two or more subpixels among a plurality of subpixels included in the display area DA. For example, the first data cell area D-CELL1 may overlap with a first group including two or more first subpixels, and the second data cell area D-CELL2 may overlap with a second group of two or more second subpixels. The two or more first subpixels included in the first group and the two or more second subpixels included in the second group may be different from each other.

A pen (e.g., the pen 100 of FIG. 3A) can recognize a plurality of code patterns CP based on redirected light, recognize a plurality of first cell guide lines CGL1 and a plurality of second cell guide lines CGL2 based on the result of the recognizing, and recognize a plurality of data cell areas D-CELL partitioned by the plurality of first cell guide lines CGL1 and the plurality of second cell guide lines CGL2.

The pen 110 can recognize a disposition location pattern of a plurality of data code patterns CP_CELL included in at least one of the plurality of data cell areas D-CELL, and determine a location of the pen 110 (i.e., a touch location) based on the result of the recognizing.

Referring to FIG. 10, for example, when the pen 110 touches a location Pt at which the first data cell area D-CELL1 is centered, the pen 110 can recognize a corresponding disposition location pattern of a plurality of data code patterns CP_CELL included in each of the first to fifth data cell areas (D-CELL1 to D-CELL5) based on results obtained by sensing redirected light with shade differences or wavelength differences, and calculate a more precise touch location based on the first to fifth coordinates corresponding to the first to fifth data cell areas (D-CELL1 to D-CELL5) and differences in signal intensity of the redirected light.

Hereinafter, example structures of code patterns CP disposed in the display panel 210 according to example embodiments of the present disclosure are described in more detail.

Figure 11:
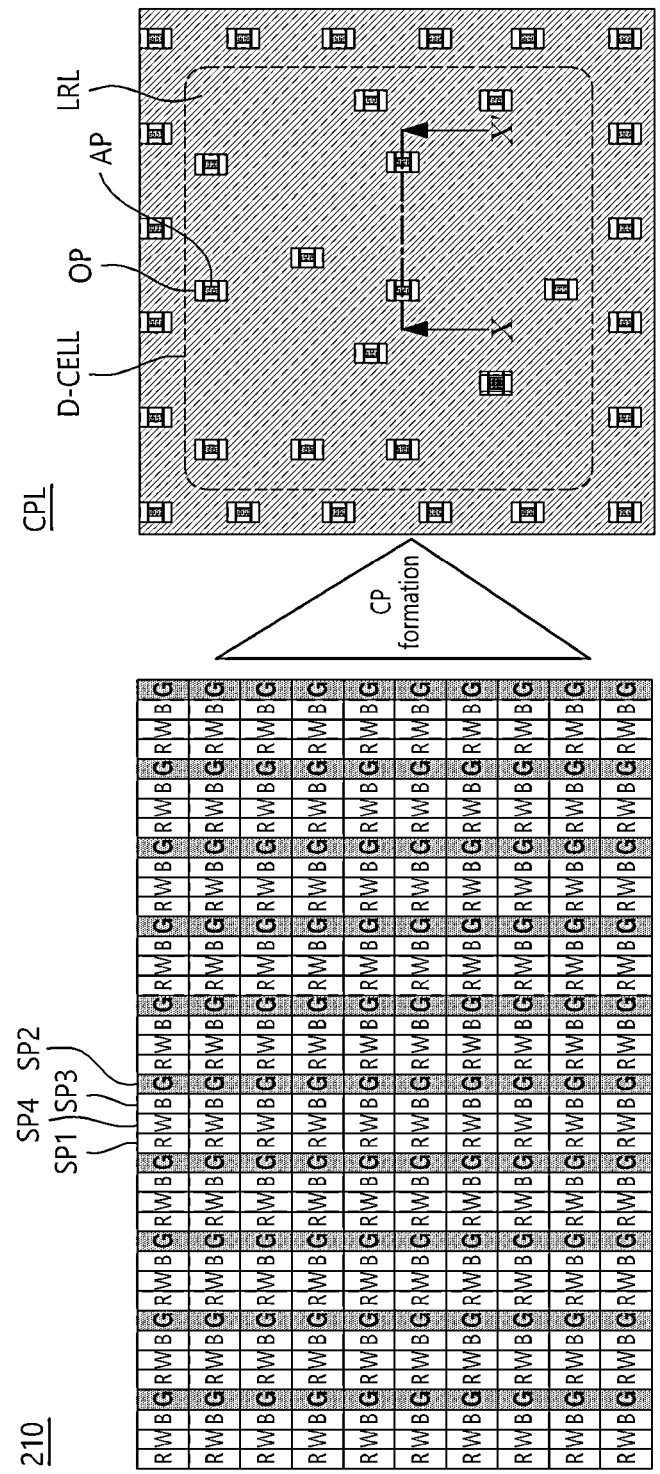
FIG. 11 illustrates an example scheme of disposing code patterns in the display panel according to embodiments of the present disclosure.

FIG. 11 illustrates an example scheme of disposing code patterns in the display panel 210 according to embodiments of the present disclosure.

Referring to FIG. 11, in one or more embodiments, a code pattern layer CPL included in the display panel 210 may include a photoactive layer LRL and one or more absorption patterns AP.

The photoactive layer LRL may include a plurality of openings OP.

One or more openings OP disposed in one data cell area D-CELL among the plurality of openings OP included in the photoactive layer LRL may express one coordinate data.

Each of the plurality of openings OP included in the photoactive layer LRL may overlap with a corresponding absorption pattern AP in the vertical direction.

In one or more embodiments, absorption patterns AP included in the display device 100 may be color filters CF capable of transmitting light having a specific color. For example, an absorption pattern AP may be a color filter CF capable of transmitting light of a color emitted from any one subpixel among a first subpixel SP1 emitting first color light, a second subpixel SP2 emitting second color light, a third subpixel SP3 emitting third color light, and a fourth subpixel SP4 emitting fourth color light.

For example, absorption patterns AP may be second color filters CF2 capable of transmitting the second color light. For example, the second color light may be green light.

Each of the plurality of openings OP included in the photoactive layer LRL may overlap with a corresponding subpixel SP emitting light of a specific color.

Each of the plurality of openings OP included in the photoactive layer LRL may overlap with a corresponding light emitting element ED emitting light of a specific color. That is, each of the plurality of openings OP included in the photoactive layer LRL may overlap with a corresponding light emitting area EA through which light of the specific color is emitted.

For example, among first subpixels SP1 emitting the first color light, second subpixels SP2 emitting the second color light, third subpixels SP3 emitting the third color light, and fourth subpixels SP4 emitting the fourth color light, a plurality of openings OP included in the photoactive layer LRL may overlap with the second subpixels SP2. Each of the plurality of openings OP included in the photoactive layer LRL may overlap with a corresponding light emitting element ED emitting the second color light and included in each second subpixel SP2. For example, each of the plurality of openings OP included in the photoactive layer LRL may overlap with a corresponding light emitting area EA configured by a corresponding light emitting element ED included in each second subpixel SP2 and emitting the second color light. For example, the second color light may be green light.

Figure 12:
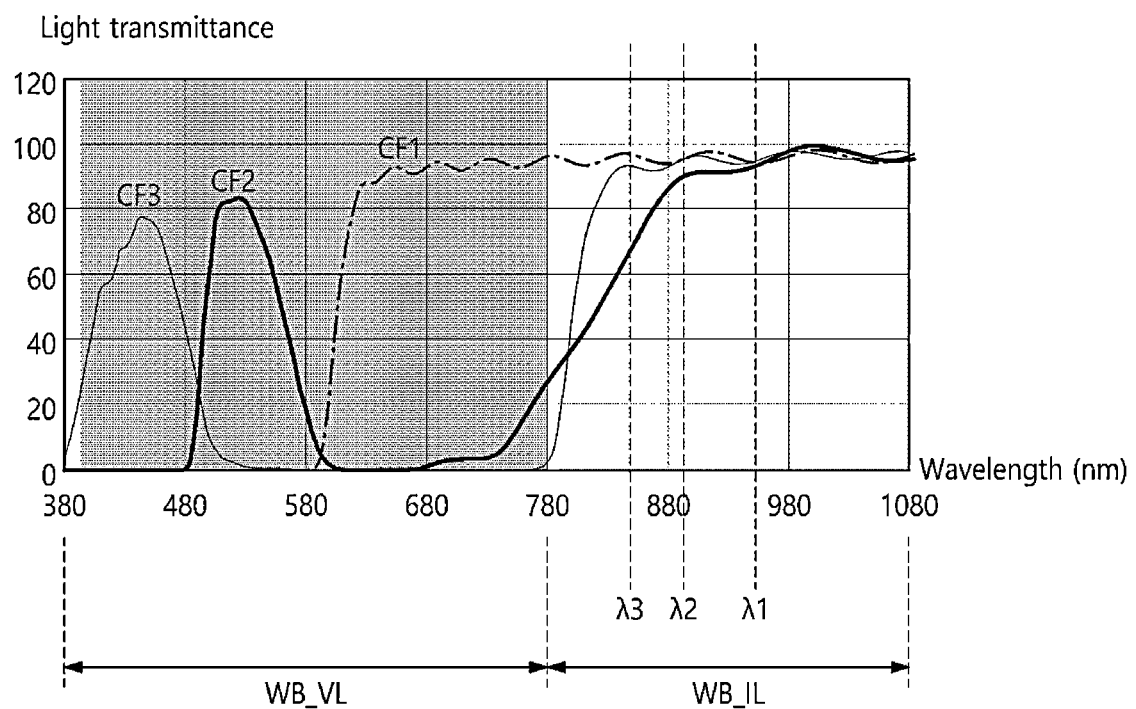
FIG. 12 illustrates example light transmission spectra of color filters disposed in the display panel according to embodiments of the present disclosure.

FIG. 12 illustrates example light transmission spectra of color filters (CF1, CF2, and CF3) disposed in the display panel 210 according to embodiments of the present disclosure.

Referring to FIG. 12, in one or more example embodiments, a color filter layer CFL of the display panel 210 may include a first color filter CF1 capable of transmitting first color light, a second color filter CF1 capable of transmitting second color light, and a third color filter CF3 capable of transmitting third color light.

The transmission spectrum of FIG. 12 shows respective light transmittance of the first color filter CF1, the second color filter CF2, and the third color filter CF3, in the visible light wavelength band WB_VL of approximately 380 nm to 780 nm and the infrared wavelength band WB_IL of approximately 780 nm to 1080 nm. Here, the visible light wavelength band may be the first wavelength band, and the infrared wavelength band may be the second wavelength band.

Referring to FIG. 12, the first color filter CF1 may transmit red light in the visible light wavelength band WB_VL, the second color filter CF2 may transmit green light in the visible light wavelength band WB_VL, and the third color filter CF3 may transmit blue light in the visible light wavelength band WB_VL.

Referring to FIG. 12, all of the first color filter CF1, the second color filter CF2, and the third color filters CF3 may transmit, with high transmittance, infrared light having wavelengths greater than the first specific wavelength $\lambda 1$ in the infrared wavelength band WB_IL of approximately 780 nm to 1080 nm.

Referring to FIG. 12, the first color filter CF1 may transmit, with a high transmittance, infrared light included in the infrared wavelength band WB_IL of approximately 780 nm to 1080 nm.

The second color filter CF2 may have a high transmittance for infrared light having wavelengths greater than or equal to a second specific wavelength 22 in the infrared wavelength band WB_IL of approximately 780 nm to 1080 nm, and may have a low transmittance for infrared light having wavelengths in the wavelength band of 780 nm to the second specific wavelength 22. Here, the second specific wavelength 22 may be shorter than the first specific wavelength $\lambda 1$.

The third color filter CF3 may have a high transmittance for infrared light having wavelengths greater than or equal to a third specific wavelength 23 in the infrared wavelength band WB_IL of approximately 780 nm to 1080 nm, and may have a low transmittance for infrared light having wavelengths in the wavelength band of 780 nm to the third specific wavelength 23. Here, the third specific wavelength 23 may be shorter than the second specific wavelength 22.

For example, when the second color filter CF2 is used as an absorption pattern among the first to third color filters (CF1, CF2, and CF3), the second wavelength of light for pen touch sensing may be included in a specific wavelength band greater than or equal to the third specific wavelength 23 and less than or equal to the second specific wavelength 22. For example, the specific wavelength band greater than or equal to the third specific wavelength 23 and less than or equal to the second specific wavelength 22 may be the second wavelength band described above.

In this implementation, the second color filter CF2 among the first to third color filters (CF1, CF2, and CF3) may absorb light having the second wavelength, and the first color filter CF1 and the third color filter CF3 may transmit the light having the second wavelength.

For example, when the pen 110 is configured to output light having the second wavelength included in the specific wavelength band (23 to 22), one or more of the plurality of second color filters CF2 may be used as absorption patterns for forming one or more code patterns CP.

Since the second wavelength for pen touch sensing is set as described above, even when absorption patterns for forming one or more code patterns are not separately disposed in the display panel 210, the display panel 210 can use one or more second color filters CF2 for display as absorption patterns for forming one or more code patterns CP. Accordingly, the display panel 210 may have a more simplified structure.

Referring to FIG. 12, the second wavelength band may be a specific wavelength band greater than or equal to the third specific wavelength 23 and less than or equal to the second specific wavelength 22, and may be a wavelength band in which the light transmittance of the plurality of second color filters CF2 varies greater than the light transmittance of the plurality of first color filters CF1 and the light transmittance of the plurality of third color filters CF3.

As shown in FIG. 12, for example, the second color wavelength transmitted by the second color filter CF2 may be less than the first color wavelength transmitted by the first color filter CF1 and greater than the third color wavelength transmitted by the third color filter CF3.

Hereinafter, for convenience of explanation, discussions are provided based on examples where one or more second color filter CF2 among the first to third color filters (CF1, CF2, and CF3) are used to form one or more code patterns for pen touch sensing.

Figure 13:
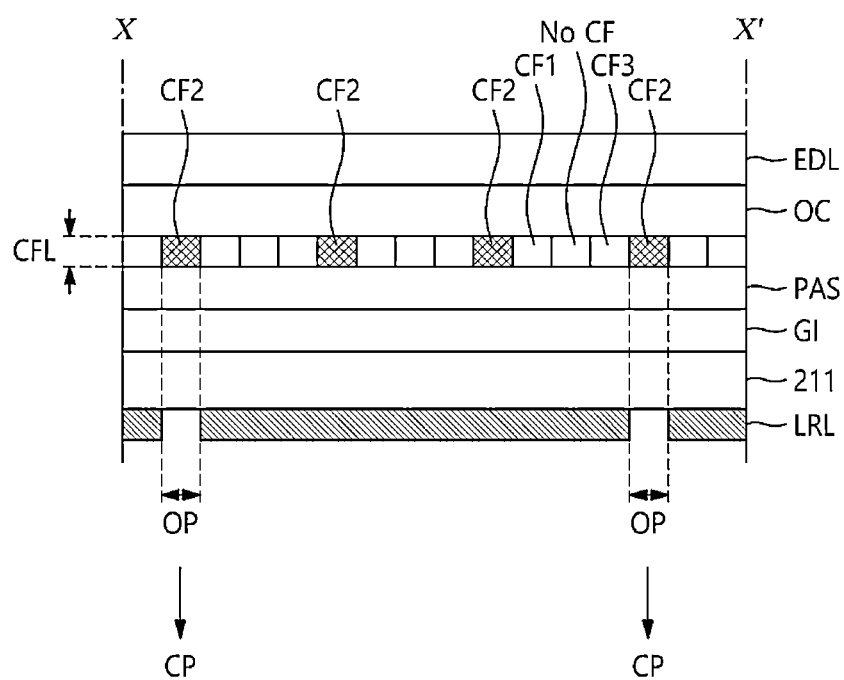
FIGS. 13 and 14 are example cross-sectional views of the display panel according to embodiments of the present disclosure.
Figure 14:
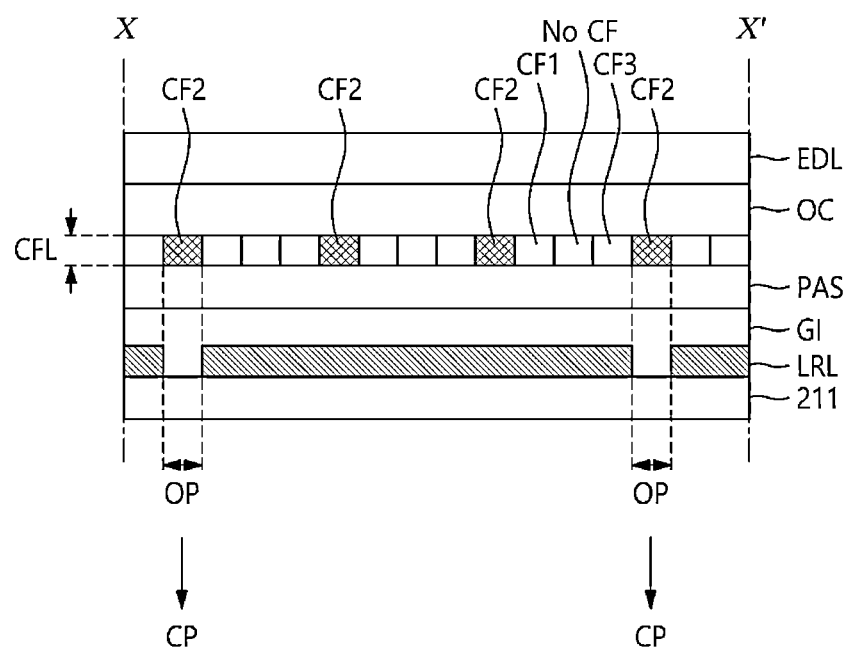
Figure 15:
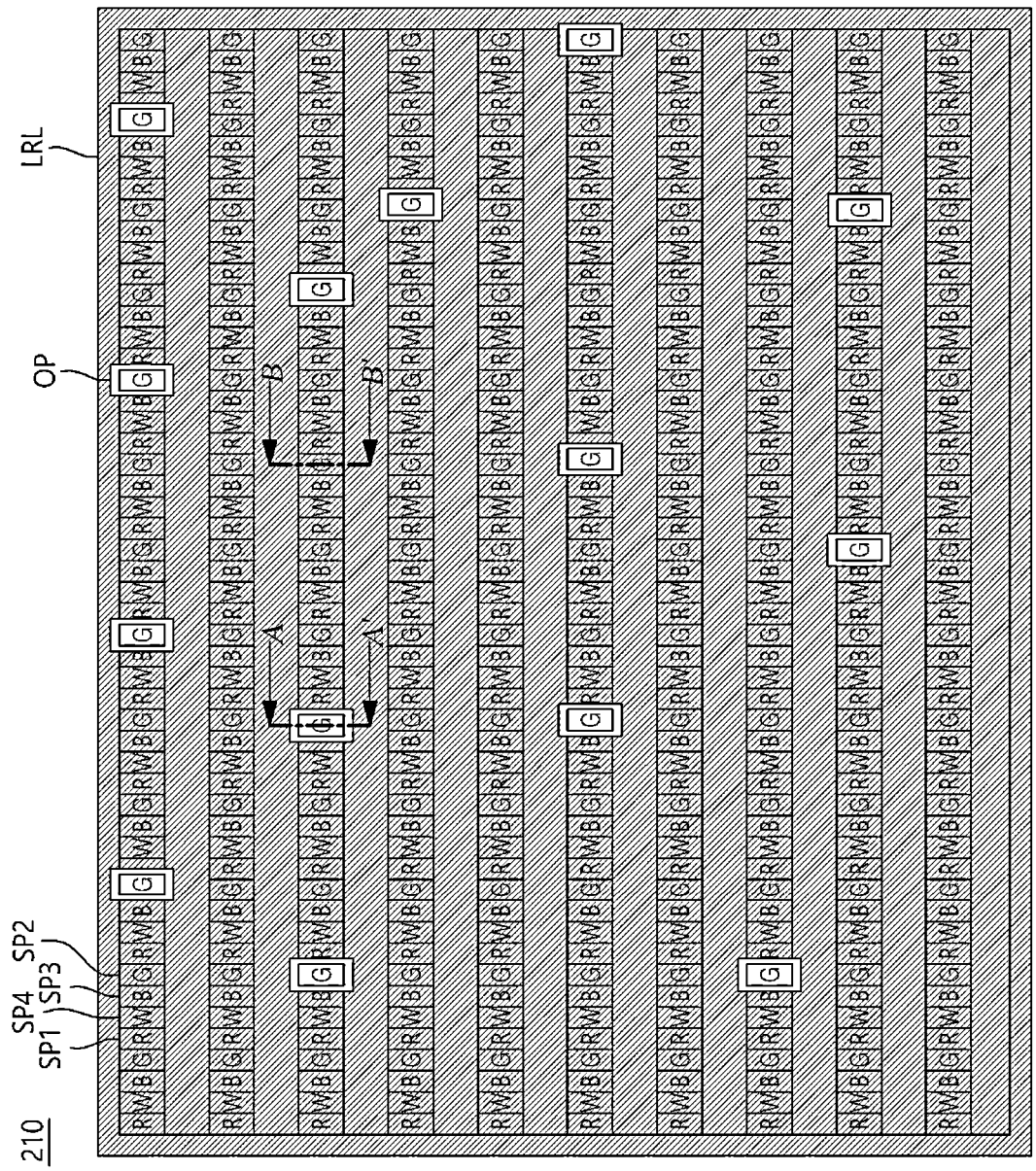
FIG. 15 is an example plan view of a code pattern deposition structure in the display panel having the bottom emission structure according to embodiments of the present disclosure.

FIGS. 13 and 14 are example cross-sectional views taken along line X-X' of FIG. 11 in the display panel 210 according to embodiments of the present disclosure. FIG. 15 is an example plan view of a code pattern deposition structure in the display panel 210 having the bottom emission structure according to embodiments of the present disclosure.

Referring to FIGS. 13 and 14, in one or more embodiments, the display panel 210 may include a first substrate 211, a color filter layer CFL in which a second color filter CF2 is disposed, and a photoactive layer LRL.

Referring to FIGS. 13 and 14, the color filter layer CFL may include a plurality of first color filters CF1 capable of transmitting first color light having a first color wavelength included in the first wavelength band, a plurality of second color filters CF2 capable of transmitting second color light having a second color wavelength included in the first wavelength band, and a plurality of third color filters CF3 capable of transmitting third color light having a third color wavelength included in the first wavelength band.

Referring to FIGS. 13, 14, and 15, the photoactive layer LRL may be disposed in all or at least part of the display area DA of the display panel 210 and may include two or more openings OP.

The photoactive layer LRL may be responsive to light having the second wavelength included in the second wavelength band different from the first wavelength band. Here, the responding of the photoactive layer LRL to the light having the second wavelength may mean that the photoactive layer LRL reflects the light having the second wavelength or converts the light having the second wavelength into light having one or more other wavelengths and radiates the light having the one or more other wavelengths. Thus, the photoactive layer LRL may have a reflection structure or a radiation structure for light having the second wavelength.

Referring to FIGS. 13, 14, and 15, in one or more embodiments, two or more openings OP included in the photoactive layer LRL may overlap with two or more second color filters CF2 among the plurality of second color filters CF2. Thus, the two or more second color filters CF2 among the plurality of second color filters CF2 may overlap with the two or more openings OP included in the photoactive layer LRL.

All or part of each of the two or more openings OP included in the photoactive layer LRL may overlap with all or part of a corresponding second color filter CF2 among the two or more second color filters CF2.

Referring to FIGS. 13, 14, and 15, in one or more embodiments, two or more openings OP included in the photoactive layer LRL may not overlap with the plurality of first color filters CF1 and the plurality of third color filters CF3.

In the example of the wavelength setting as described above, that is, the second wavelength of light emitted from the pen 110 is included in the specific wavelength band (e.g., the second wavelength band), each of the plurality of second color filters CF2 may absorb light having the second wavelength. For example, each of the plurality of second color filters CF2 may have absorption characteristics capable of absorbing light having the second wavelength, and one or more of the plurality of second color filters CF2 can serve as absorption patterns for forming one or more code patterns based on the absorption characteristics.

In the foregoing wavelength setting in which the second wavelength of light emitted from the pen 110 is included in the specific wavelength band (e.g., the second wavelength band), each of the plurality of first color filters CF1 and the plurality of third color filters CF3 may transmit light having the second wavelength.

As described above, for example, the photoactive layer LRL may reflect light having the second wavelength. In another example, the photoactive layer LRL may convert light having the second wavelength into light having one or more other wavelengths and radiate the light having the one or more other wavelengths.

The photoactive layer LRL may transmit light of wavelengths included in the first wavelength band (e.g., the visible light wavelength band). Accordingly, even when the photoactive layer LRL is located in a path through which visible light (red light, green light, blue light) emitted from a light emitting element layer EDL moves toward the back of a first substrate 211, the visible light (red light, green light, blue light) can normally come from the display panel 210. As this configuration is applied, image display can be normally performed.

Referring to FIGS. 13, 14, and 15, a part of light having the second wavelength being incident to an inside of the display device 100 after being output from the pen 110 may passes through two or more openings OP, and be absorbed by two or more second color filters CF2 overlapping with the two or more openings OP.

Referring to FIGS. 13, 14, and 15, another part of the light having the second wavelength output being incident to an inside of the display device 100 after being output from the pen 110 may be, by the photoactive layer LRL, reflected or converted into light having one or more other wavelengths, and caused to move outside of the display device 100 in the form of the light having the second wavelength or the light having the one or more other wavelengths.

Referring to FIGS. 13 and 14, the display panel 210 may include a gate insulating layer GI on the first substrate 211, a protective layer PAS on the gate insulating layer GI, an overcoat layer OC on the protective layer PAS, and a light emitting element layer EDL on the overcoat layer OC.

Referring to FIGS. 13 and 14, the color filter layer CFL may be located between the protective layer PAS and the overcoat layer OC.

Referring to FIG. 13, the photoactive layer LRL may be located under the first substrate 211. For example, the photoactive layer LRL may be located on the back surface the first substrate 211.

Referring to FIG. 14, the photoactive layer LRL may be located on or over the first substrate 211. For example, the photoactive layer LRL may be located between the first substrate 211 and the gate insulating layer GI.

Referring to FIG. 15, the display area DA of the display panel 210 may include a plurality of first subpixels SP1 emitting first color light, a plurality of second subpixels SP2 emitting second color light, a plurality of third subpixels SP3 emitting third color light, and a plurality of fourth subpixels SP4 emitting fourth color light.

Referring to FIG. 15, the first color light may be red light, the second color light may be green light, the third color light may be blue light, and the fourth color light may be white light.

Accordingly, each of the plurality of first subpixels SP1 may include a red light emitting area R emitting red light, each of the plurality of second subpixels SP2 may include a green light emitting area G emitting green light, each of the plurality of third subpixels SP3 may include a blue light emitting area B emitting blue light, and each of the plurality of fourth subpixels SP4 may include a white light emitting area W emitting white light.

For example, respective light emitting elements disposed in a red light emitting area R, a green light emitting area G, a blue light emitting area B, and a white light emitting area W may a white light emitting element emitting white light. Accordingly, referring to FIGS. 13, 14, and 15, first color filters CF1 capable of transmitting red light may be disposed in red light emitting areas R, second color filters CF2 capable of transmitting green light may be disposed in green light emitting areas G, and third color filters CF3 capable of transmitting red light may be disposed in blue light emitting areas B. A color filter may not be disposed in white light emitting areas W.

In an example where the display panel 210 has the bottom emission structure, each of the plurality of first color filters CF1, the plurality of second color filters CF2, and the plurality of third color filters CF3 may not overlap with transistors disposed in a transistor layer. In another example where the display panel 210 has the top emission structure, each of the plurality of first color filters CF1, the plurality of second color filters CF2, and the plurality of third color filters CF3 may overlap with transistors disposed in the transistor layer.

Referring to FIGS. 15 and 10, at least some of second color filters CF2 overlapping with openings OP formed in the photoactive layer LRL shown in FIG. 15 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of second color filters CF2 overlapping with openings OP formed in the photoactive layer LRL shown in FIG. 15 may correspond to code patterns (CP_CGL1, CP_CGL2) corresponding to first and second cell guide lines (CGL1, CGL2) around a data cell area D-CELL.

Figure 16:
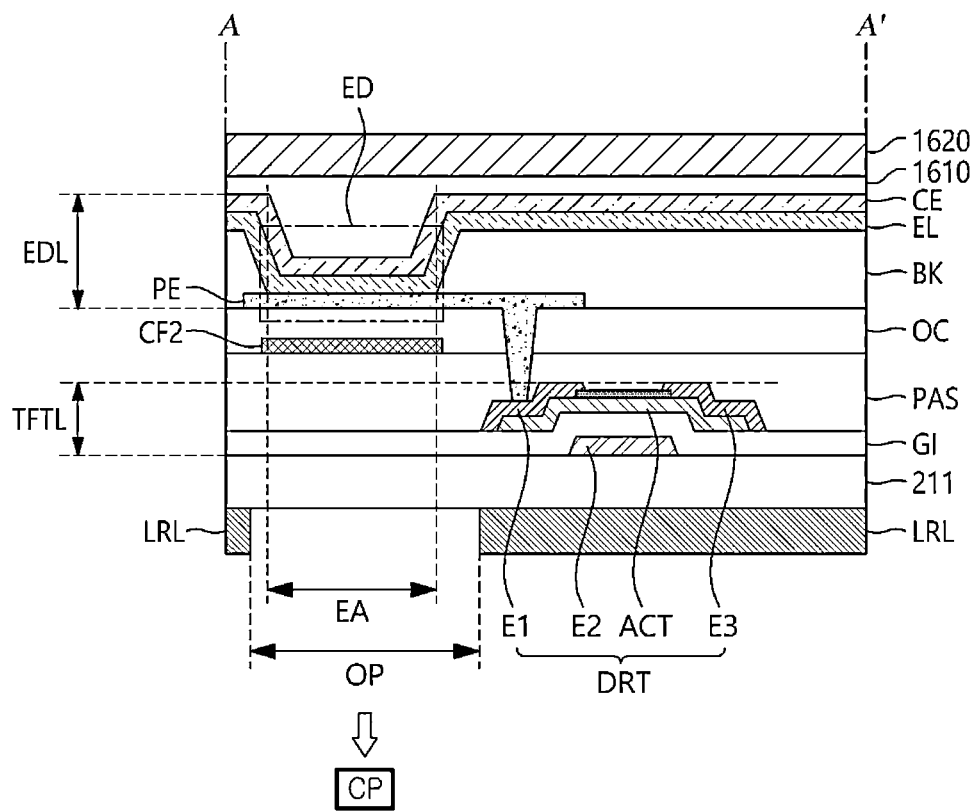
FIG. 16 is an example cross-sectional view taken along line A-A' in the display panel of FIG. 15 according to embodiments of the present disclosure.
Figure 17:
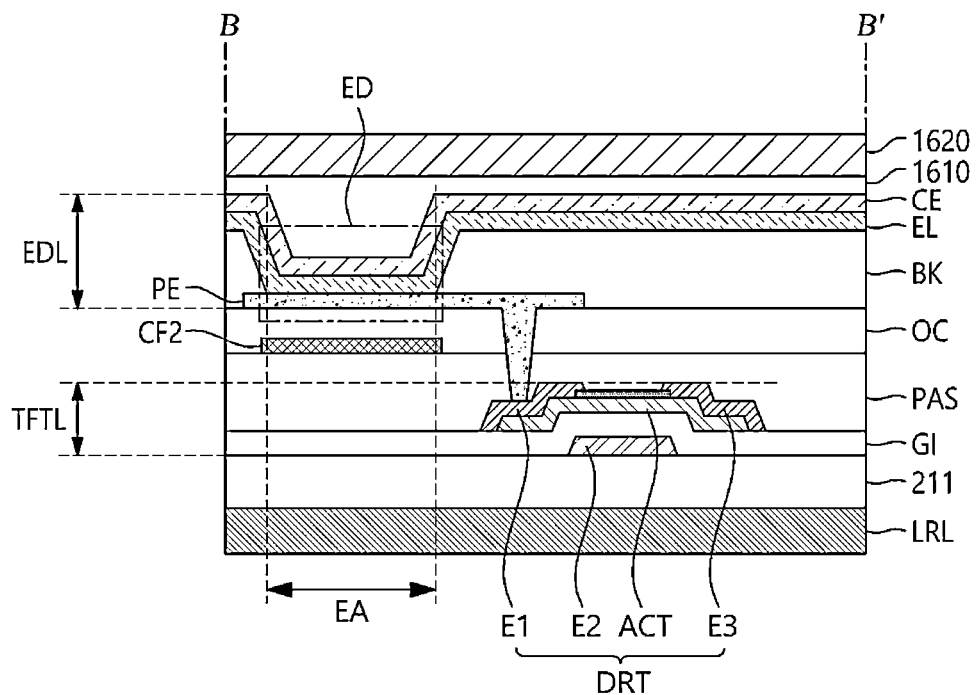
FIG. 17 is an example cross-sectional view taken along line B-B' in the display panel of FIG. 15 according to embodiments of the present disclosure.

FIG. 16 is an example cross-sectional view taken along line A-A' in the display panel 210 of FIG. 15 according to one embodiment. FIG. 17 is an example cross-sectional view taken along line B-B' in the display panel 210 of FIG. 15 according to one embodiment.

Referring to FIGS. 16 and 17, in one or more embodiments, the display panel 210 may include a first substrate 211, a transistor layer TFTL located on the first substrate 211, a light emitting element layer EDL located over the transistor layer TFTL, an adhesive layer 1610 on the light emitting element layer EDL, and a second substrate 1620 on the adhesive layer 1610.

Referring to FIGS. 16 and 17, the transistor layer TFTL may include metal layers and insulating layers for forming transistors such as a driving transistor DRT, and the like.

A second electrode E2, which is a gate electrode E2, may be disposed on the first substrate 211, a gate insulating layer GI may be disposed on the gate electrode E2, and an active layer ACT may be disposed on the gate insulating layer GI. First and third electrodes (E1 and E3) may be disposed in opposing two portions of the active layer ACT, respectively. For example, the first electrode E1 may be the source electrode or the drain electrode of the driving transistor DRT, the second electrode E2 may be the gate electrode of the driving transistor DRT, and the third electrode E3 may be the drain electrode or source electrode of the driving transistor DRT.

Referring to FIGS. 16 and 17, a protective layer PAS may be disposed on a transistor such as a driving transistor DRT, or the like. The color filter layer CFL may be disposed on the protective layer PAS, and one or more second color filters CF2 may be disposed in the color filter layer CFL. An overcoat layer OC may be disposed on the second color filter CF2.

Referring to FIGS. 16 and 17, a pixel electrode PE may be disposed on the overcoat layer OC. A bank BK may be disposed on the pixel electrode PE. The bank BK may include an opening overlapping with a portion of the pixel electrode PE. An element intermediate layer EL may be disposed on the bank BK. The element intermediate layer EL may be disposed on a portion of the pixel electrode PE overlapping with the opening of the bank BK, disposed on at least one side surface of the bank BK, and disposed on the top of the bank BK. A common electrode CE may be disposed on the element intermediate layer EL.

Referring to FIGS. 16 and 17, a light emitting element ED may be configured by a stack configuration where the pixel electrode PE, the element intermediate layer EL, and the common electrode CE overlap with each other. An area where the light emitting element ED is configured may form a corresponding light emitting area EA.

Referring to FIGS. 16 and 17, the adhesive layer 1610 may be disposed on the common electrode CE, and the second substrate 1620 may be disposed on the adhesive layer 1610. The second substrate 1620 may be an encapsulation substrate serving as an encapsulation layer ENCAP.

Referring to FIGS. 16 and 17, in an example where the display panel 210 has the bottom emission structure, the color filter layer CFL may be located between the first substrate 211 and the light emitting element layer EDL.

The second color filter CF2 disposed in the color filter layer CFL may overlap with the light emitting element ED and may be disposed in the light emitting area EA.

For the bottom emission structure of the display panel 210, the second color filter CF2 disposed in the color filter layer CFL may not overlap with transistors disposed in the transistor layer TFTL.

Referring to FIGS. 16 and 17, the photoactive layer LRL may be located under the color filter layer CFL, and for example, may be located on the back substrate of the first substrate 211.

Referring to FIGS. 15 and 16, the green light emitting area G indicated by line A-A' in FIG. 15 may be an area where an opening OP of the photoactive layer LRL is present and where the second color filter CF2 overlapping with the opening OP of the photoactive layer LRL is disposed.

Referring to FIGS. 15 and 17, the green light emitting area G indicated by line B-B' in FIG. 15 may be an area where the second color filter CF2 is disposed and where an opening OP of the photoactive layer LRL is not present.

Referring to FIGS. 16 and 17, at the opening OP of the photoactive layer LRL, as the second color filter CF2 absorbs light having the second wavelength, reflected light or radiated light responsive to light having the second wavelength may not be caused, and thus, there is no redirected light coming from the display panel 210. In contrast, at a portion of the photoactive layer LRL where an opening OP is not present, redirected light (reflected light or radiated light) responsive to light having the second wavelength may be caused to move outside of the display panel 210.

Therefore, due to openings OP of the photoactive layer LRL, the pen 110 can recognize corresponding one or more code patterns CP through the back surface of the display panel 210 based on a shade difference of the received redirected light (reflected light or radiated light).

Figure 18:
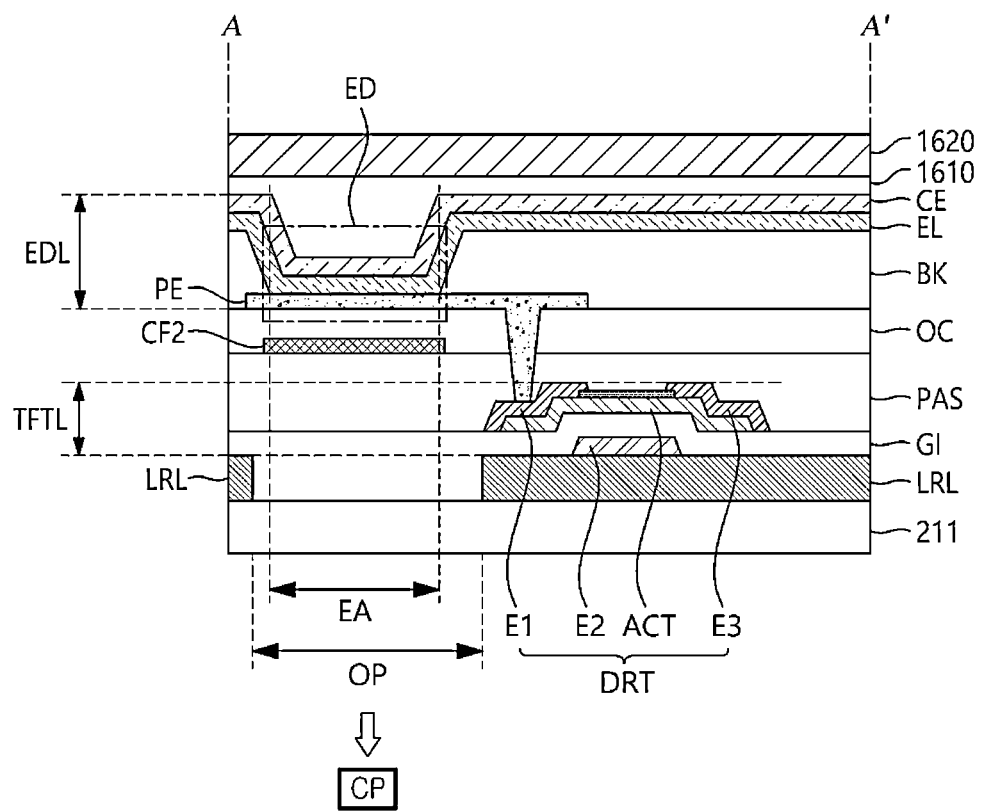
FIG. 18 is an example cross-sectional view taken along line A-A' in the display panel of FIG. 15 according to embodiments of the present disclosure.
Figure 19:
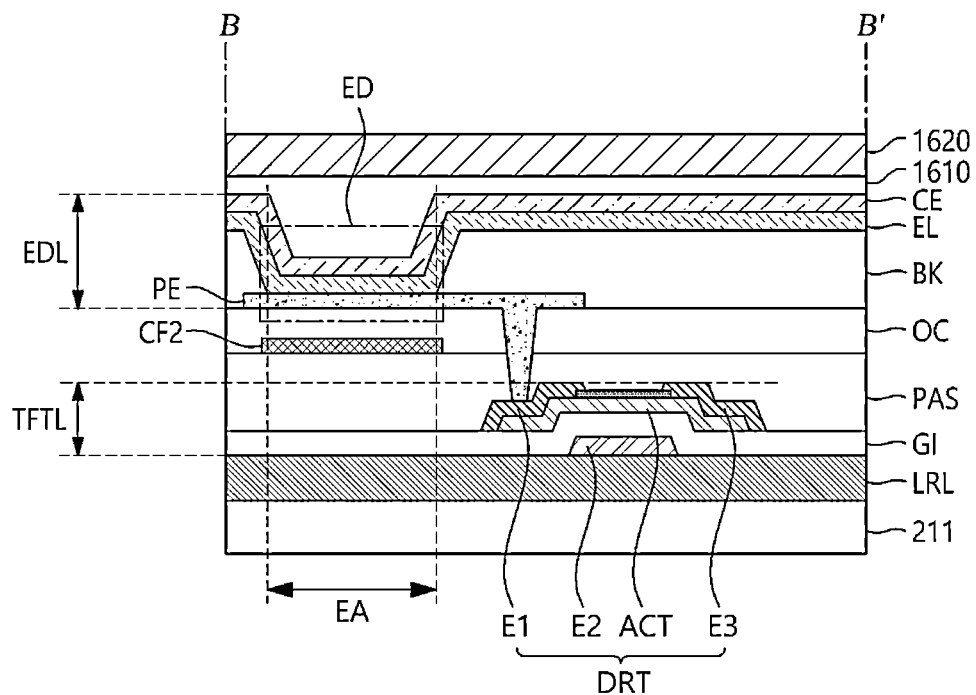
FIG. 19 is an example cross-sectional view taken along line B-B' in the display panel of FIG. 15 according to embodiments of the present disclosure.

FIG. 18 is an example cross-sectional view taken along line A-A' in the display panel 210 of FIG. 15 according to one embodiment. FIG. 19 is an example cross-sectional view taken along line B-B' in the display panel 210 of FIG. 15 according to one embodiment.

The configurations of the cross-sectional views of FIGS. 18 and 19 may be the same as the configurations of the cross-sectional views of FIGS. 16 and 17 except for a vertical location of a corresponding photoactive layer LRL. The configuration of FIG. 18 may correspond to the configuration of FIG. 16, and the configuration of FIG. 19 may correspond to the configuration of FIG. 17. Taking account of such a similarity, discussions on the configurations of FIGS. 18 and 19 are provided below by focusing on features different from the configurations of FIGS. 16 and 17.

Referring to FIGS. 18 and 19, a photoactive layer LRL may be located between a driving transistor DRT disposed in a transistor layer TFTL and a first substrate 211.

As described above, discussions have been provided on the examples where a code pattern deposition structure is applied to the display panel 210 having the bottom emission structure. Hereinafter, discussions are briefly provided on examples where a code pattern deposition structure is applied to the display panel 210 having the top emission structure. In the following description, discussions on a code pattern deposition structure applied to the display panel 210 having the top emission structure according to example embodiments of the present disclosure are provided by focusing on features different from the configuration of the display panel 210 having the bottom emission structure.

Figure 20:
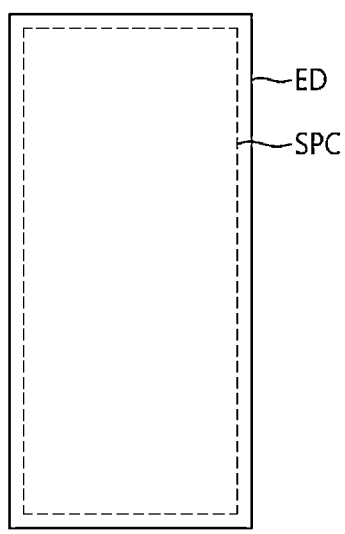
FIG. 20 is an example plan view of a subpixel in an example where the display panel has a top emission structure according to embodiments of the present disclosure.

FIG. 20 illustrates an example plan view of a subpixel in an example where the display panel has the top emission structure according to embodiments of the present disclosure.

Referring to FIG. 20, each subpixel SP may include a light emitting element ED and a subpixel circuit SPC for controlling light emitting of the light emitting element ED.

In an example where the display panel 210 has the top emission structure, a corresponding light emitting element ED and a corresponding subpixel circuit SPC included in each subpixel SP may overlap with each other. Accordingly, the display panel 210 having the top emission structure may have a high aperture ratio.

Figure 21:
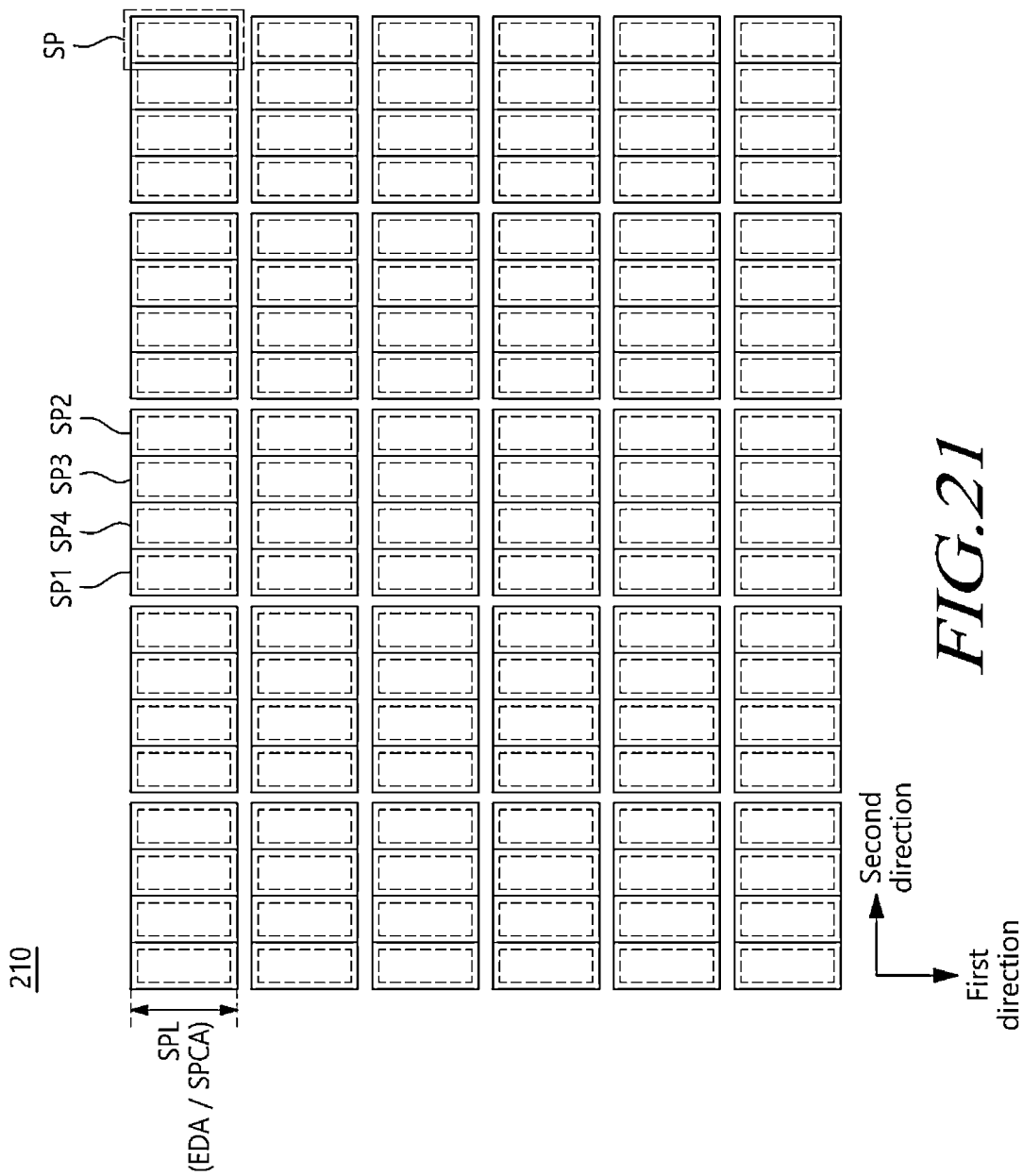
FIG. 21 is an example plan view of the display panel having the top emission structure according to embodiments of the present disclosure.

FIG. 21 is an example plan view of the display panel 210 having the top emission structure according to embodiments of the present disclosure.

Referring to FIG. 21, in one or more embodiments, the display panel 210 may include a plurality of subpixel array areas SPL. Each of the plurality of subpixel array areas SPL may include a plurality of subpixels SP.

For example, each of the plurality of subpixel array areas SPL may be disposed adjacent to each other in a first direction. The plurality of subpixels SP included in each of the plurality of subpixel array areas SPL may be disposed adjacent to each other in a second direction. For example, the first direction may be a column direction and the second direction may be a row direction. In another example, the first direction may be the row direction and the second direction may be the column direction. Hereinafter, for merely convenience of explanation, discussions are provided based on examples where the first direction is the column direction and the second direction is the row direction.

The plurality of subpixels SP may include a plurality of first subpixels SP1 emitting first color light, a plurality of second subpixels SP2 emitting second color light, and a plurality of third subpixels SP3 emitting third color light.

The first color light may have a first color wavelength included in a first wavelength band.

The second color light may have a second color wavelength included in the first wavelength band.

The third color light may have a third color wavelength included in the first wavelength band.

The plurality of subpixels SP may further include a plurality of fourth subpixels SP4 emitting fourth color light.

The fourth color light may have a fourth color wavelength included in the first wavelength band.

For example, the first wavelength band may be a visible light wavelength band.

For example, the first color wavelength may be a red wavelength, and the first color light may be red light. The second color wavelength may be a green wavelength, and the second color light may be green light. The third color wavelength may be a blue wavelength, and the third color light may be blue light. The fourth color wavelength may be a white wavelength, and the fourth color light may be white light. Hereinafter, for convenience of explanation, discussions are provided based on examples where the first color light is red light, the second color light is green light, the third color light is blue light, and the fourth color light is white light.

In the example where the display panel 210 has the top emission structure, each of the plurality of subpixel array areas SPL may include a light emitting element array area EDA and a subpixel circuit array area SPCA, which overlap with each other in the vertical direction.

Figure 22:
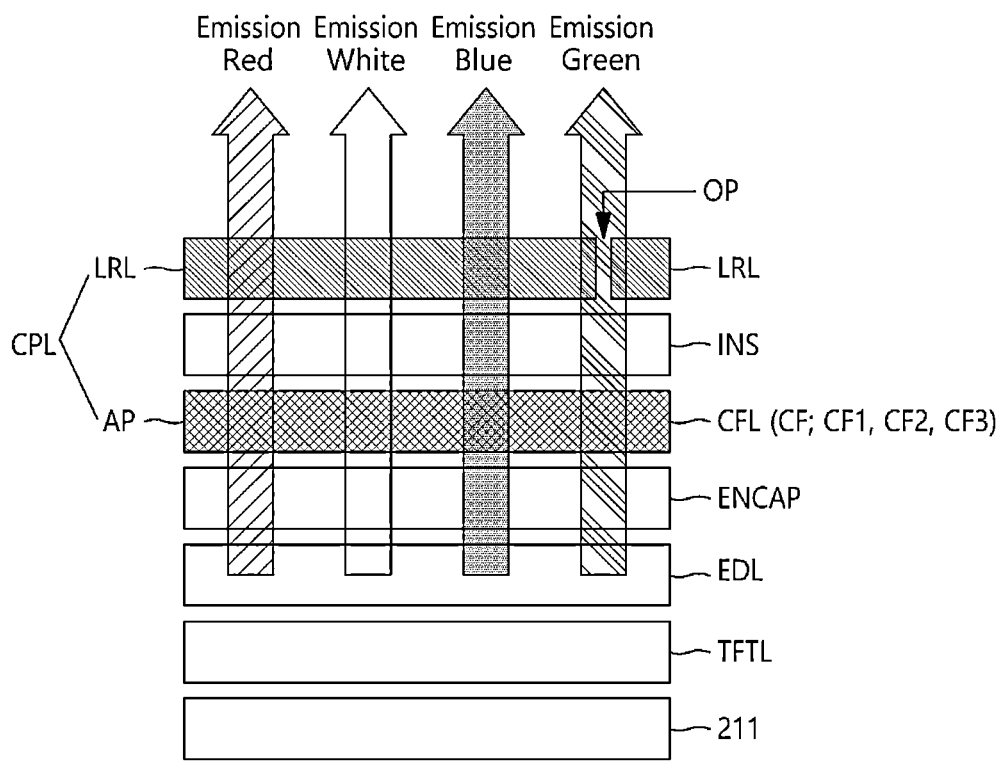
FIG. 22 is an example cross-sectional view of the display panel having the top emission structure according to embodiments of the present disclosure.

FIG. 22 illustrates an example cross-sectional view of the display panel 210 having the top emission structure according to embodiments of the present disclosure.

Referring to FIG. 22, in one or more aspects, the display panel 210 of the display device 100 may include a first substrate 211, a transistor layer TFTL located on the first substrate 211, a light emitting element layer EDL located on the transistor layer TFTL, an encapsulation layer ENCAP located on the light emitting element layer EDL, a color filter layer CFL located on the encapsulation layer ENCAP, and a photoactive layer LRL disposed over the color filter layer CFL.

Referring to FIG. 22, the color filter layer CFL may include a plurality of color filters CF. The plurality of color filters CF may transmit light having the first wavelength included in the first wavelength band.

Referring to FIG. 22, the photoactive layer LRL may be responsive to light having the second wavelength included in the second wavelength band different from the first wavelength band. For example, such response to light having the second wavelength may include reflection, radiation, and the like. In the example of reflection as response for light having the second wavelength, the photoactive layer LRL may reflect the light having the second wavelength. In the example of radiation as response for light having the second wavelength, the photoactive layer LRL may convert light having the second wavelength into light having one or more other wavelengths and radiate the light having the one or more other wavelengths.

Referring to FIG. 22, as light having the second wavelength or light having one or more other wavelengths comes from the display device 100, the pen 110 can receive the light having the second wavelength or the light having one or more other wavelengths coming from the display device 100 and output sensing data to the display device 100.

Referring to FIG. 22, the plurality of color filters CF may include a plurality of first color filters CF1, a plurality of second color filters CF2, and a plurality of third color filters CF3.

The plurality of first color filters CF1 may be located in the color filter layer CFL and may transmit first color light having a first color wavelength included in the first wavelength band.

The plurality of second color filters CF2 may be located in the color filter layer CFL and may transmit second color light having a second color wavelength included in the first wavelength.

The plurality of third color filters CF3 may be located in the color filter layer CFL and may transmit third color light having a third color wavelength included in the first wavelength band.

Referring to FIG. 22, the photoactive layer LRL may include two or more openings OP.

Referring to FIG. 22, the two or more openings OP of the photoactive layer LRL may overlap with two or more color filters CF capable of transmitting light of a specific color. For example, the two or more openings OP may overlap with two or more second color filters CF2 capable of transmitting second color light among the plurality of second color filters CF2. For example, the two or more second color filters CF2 may be green color filters capable of transmitting green light. Hereinafter, for convenience of explanation, discussions are provided based on examples where two or more openings OP formed in the photoactive layer LRL overlap with two or more second color filters CF2 among the plurality of second color filters CF2.

Referring to FIG. 22, light having the second wavelength incident on the display panel 210 may pass through two or more openings OP formed in the photoactive layer LRL and reach two or more second color filters CF2. The light having the second wavelength reaching the two or more second color filters CF2 may be absorbed by the two or more second color filters CF2.

Referring to FIG. 22, the display panel 210 having the top emission structure may include a code pattern layer CPL for pen touch sensing. The code pattern layer CPL may include the photoactive layer LRL and one or more absorption patterns AP.

Referring to FIG. 22, at least one insulating layer INS may be disposed between the photoactive layer LRL and the absorption pattern AP included in the code pattern layer CPL.

The photoactive layer LRL may be a reflection structure configured to reflect light having the second wavelength or a radiation structure configured to convert light having the second wavelength into light having one or more other wavelengths and radiate the light having the one or more other wavelengths.

The absorption pattern AP may be a structure configured to absorb light having the second wavelength.

In one or more embodiments, the one or more absorption patterns AP included in the display panel 210 may be one or more of color filters of a specific color included in the color filter layer CFL.

For example, among the plurality of first color filters CF1, the plurality of second color filters CF2, and the plurality of third color filters CF3, one or more of the plurality of second color filters CF2 may be used as one or more absorption patterns AP. For example, the second color light transmitted by the plurality of second color filters CF2 may be green light.

Referring to FIG. 22, the photoactive layer LRL may be disposed over the color filter layer CFL. The insulating layer INS may be disposed between the photoactive layer LRL and the absorption pattern AP included in the code pattern layer CPL.

Referring to FIG. 22, a cover window (e.g., a cover glass) may be disposed on the photoactive layer LRL.

Figure 23:
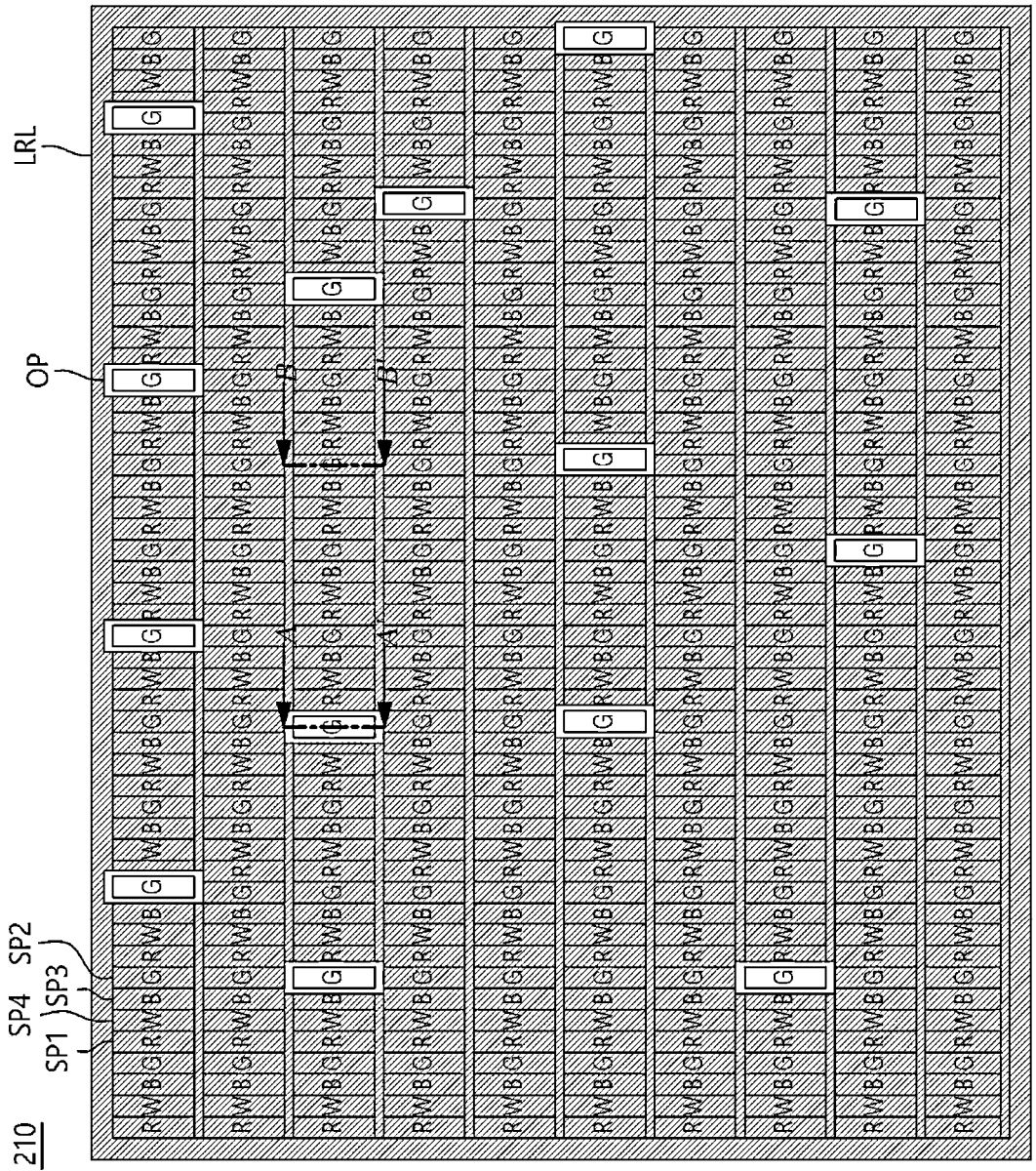
FIG. 23 is an example plan view of a code pattern deposition structure in the display panel having the top emission structure according to embodiments of the present disclosure.
Figure 24:
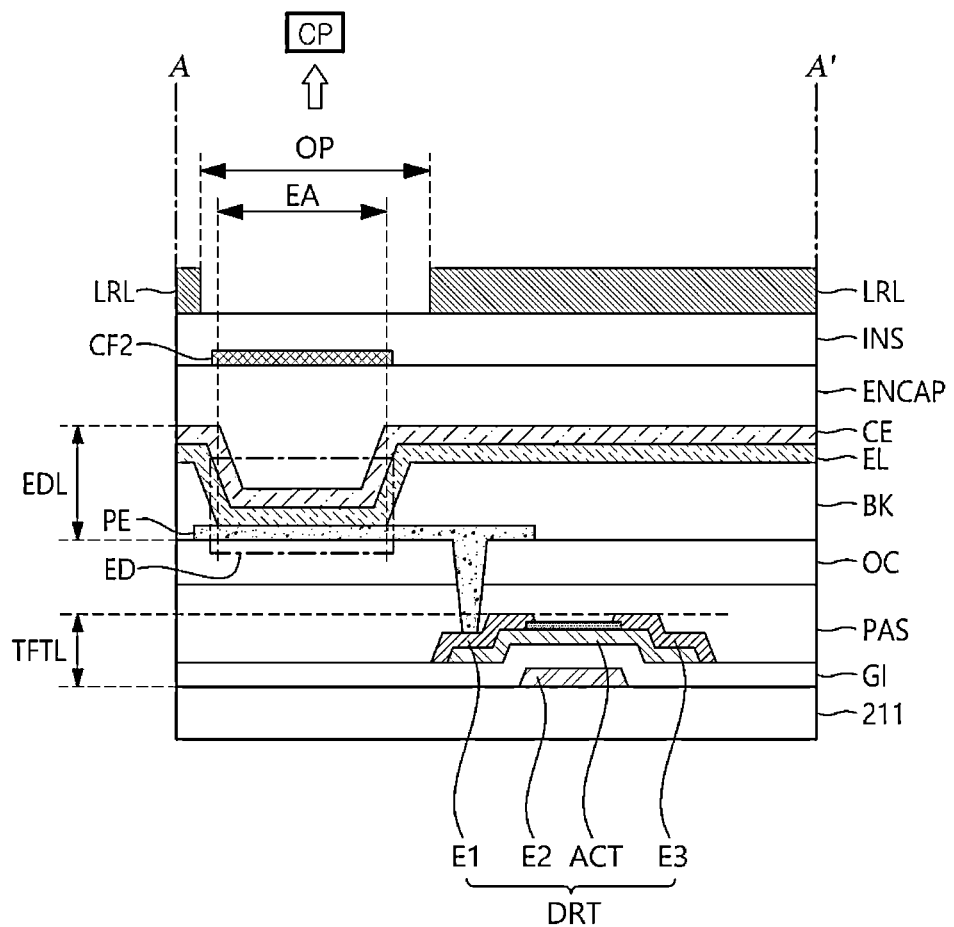
FIG. 24 is an example cross-sectional view taken along line A-A' in the display panel of FIG. 23 according to embodiments of the present disclosure.
Figure 25:
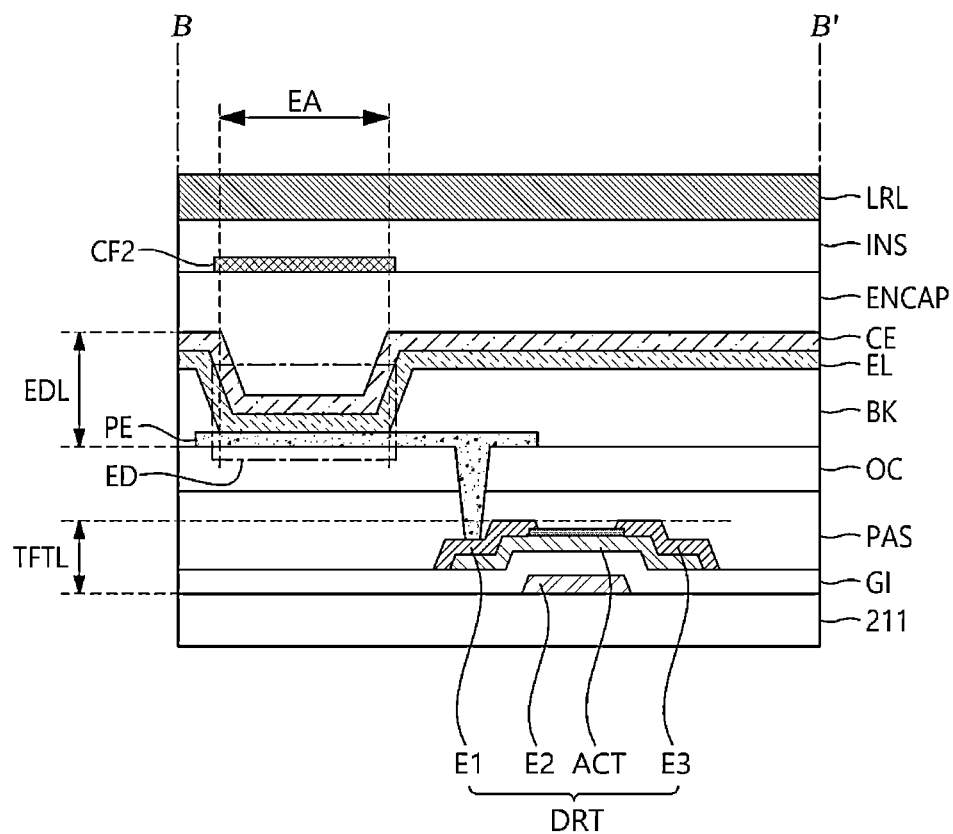
FIG. 25 is an example cross-sectional view taken along line B-B' in the display panel of FIG. 23 according to embodiments of the present disclosure.

FIG. 23 is an example plan view of a code pattern deposition structure in the display panel having the top emission structure according to embodiments of the present disclosure. FIG. 24 is an example cross-sectional view taken along line A-A' in the display panel of FIG. 23 according to one embodiment. FIG. 25 is an example cross-sectional view taken along line B-B' in the display panel of FIG. 23 according to one embodiment.

The configuration of FIG. 23 may be the same as the configuration of FIG. 15 except that a light emitting element array area EDA and a subpixel circuit array area SPCA are vertically aligned.

Referring to FIGS. 24 and 25, the display panel 210 having the top emission structure may include a first substrate 211, a transistor layer TFTL located on the first substrate 211, a light emitting element layer EDL located over the transistor layer TFTL, and an encapsulation layer ENCAP located on the light emitting element layer EDL.

Referring to FIGS. 24 and 25, the transistor layer TFTL may include metal layers and insulating layers for forming transistors such as a driving transistor DRT, and the like.

A second electrode E2, which is a gate electrode E2, may be disposed on the first substrate 211, a gate insulating layer GI may be disposed on the gate electrode E2, and an active layer ACT may be disposed on the gate insulating layer GI. First and third electrodes (E1 and E3) may be disposed in opposing two portions of the active layer ACT, respectively. For example, the first electrode E1 may be the source electrode or the drain electrode of the driving transistor DRT, the second electrode E2 may be the gate electrode of the driving transistor DRT, and the third electrode E3 may be the drain electrode or source electrode of the driving transistor DRT.

Referring to FIGS. 24 and 25, a protective layer PAS may be disposed on a transistor such as a driving transistor DRT, or the like. An overcoat layer OC serving as a planarization layer may be disposed on the protective layer PAS.

Referring to FIGS. 24 and 25, a pixel electrode PE may be disposed on the overcoat layer OC. A bank BK may be disposed on the pixel electrode PE. The bank BK may include an opening overlapping with a portion of the pixel electrode PE. An element intermediate layer EL may be disposed on the bank BK. The element intermediate layer EL may be disposed on a portion of the pixel electrode PE overlapping with the opening of the bank BK, disposed on at least one side surface of the bank BK, and disposed on the top of the bank BK. A common electrode CE may be disposed on the element intermediate layer EL.

Referring to FIGS. 24 and 25, a light emitting element ED may be configured by a stack configuration where the pixel electrode PE, the element intermediate layer EL, and the common electrode CE overlap with each other. An area where the light emitting element ED is configured may form a corresponding light emitting area EA.

Referring to FIGS. 24 and 25, the encapsulation layer ENCAP may be disposed on the common electrode CE. The encapsulation layer ENCAP may include one or more inorganic layers and one or more organic layers. For example, the encapsulation layer ENCAP may have a structure in which an inorganic layer, an organic layer, and an inorganic layer are stacked.

Referring to FIGS. 24 and 25, the color filter layer CFL in which a second color filter CF2 is disposed may be located on the encapsulation layer ENCAP. An insulating layer INS may be disposed on the second color filter CF2, and a photoactive layer LRL may be disposed on the insulating layer INS.

Referring to FIGS. 24 and 25, the second color filter CF2 may overlap with the light emitting element ED and may be disposed in the light emitting area EA.

Since the display panel 210 has the top emission structure, the second color filter CF2 may be configured to overlap with one or more transistors disposed in the transistor layer TFTL.

Referring to FIGS. 23 and 24, the green light emitting area G indicated by line A-A' in FIG. 23 may be an area where an opening OP of the photoactive layer LRL is present and where the second color filter CF2 overlapping with the opening OP of the photoactive layer LRL is disposed.

Referring to FIGS. 23 and 25, the green light emitting area G indicated by line B-B' in FIG. 23 may be an area where the second color filter CF2 is disposed and where an opening OP of the photoactive layer LRL is not present.

Referring to FIGS. 24 and 25, at the opening OP of the photoactive layer LRL, as the second color filter CF2 absorbs light having the second wavelength, reflected light or radiated light responsive to light having the second wavelength may not be caused, and thus, there is no redirected light coming from the display panel 210. In contrast, at a portion of the photoactive layer LRL where an opening OP is not present, redirected light (reflected light or radiated light) responsive to light having the second wavelength may be caused to move outside of the display panel 210.

Therefore, due to openings OP of the photoactive layer LRL, the pen 110 can recognize corresponding one or more code patterns CP through the front surface of the display panel 210 based on a shade difference of the received redirected light (reflected light or radiated light).

Referring to FIGS. 23 and 10, at least some of second color filters CF2 overlapping with openings OP formed in the photoactive layer LRL shown in FIG. 23 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of second color filters CF2 overlapping with openings OP formed in the photoactive layer LRL shown in FIG. 23 may correspond to code patterns (CP_CGL1, CP_CGL2) corresponding to first and second cell guide lines (CGL1, CGL2) around a data cell area D-CELL.

The example embodiments described above will be briefly described as follows.

According to the example embodiments of the present disclosure, a display device can be provided that includes a first substrate, a plurality of first color filters included in a color filter layer and transmitting first color light having a first color wavelength included in a first wavelength band, a plurality of second color filters included in the color filter layer and transmitting second color light having a second color wavelength included in the first wavelength band, a plurality of third color filters included in the color filter layer and transmitting third color light having a third color wavelength included in the first wavelength band, and a photoactive layer responsive to light having a second wavelength included in a second wavelength band different from the first wavelength band and including two or more openings.

In one or more embodiments, the two or more openings may overlap with two or more second color filters among the plurality of second color filters.

In one or more embodiments, the two or more openings may not overlap with the plurality of first color filters and the plurality of third color filters.

In one or more embodiments, each of the plurality of second color filters may absorb the light having the second wavelength.

In one or more embodiments, each of the plurality of first color filters and plurality of third color filters may transmit the light having the second wavelength.

In one or more embodiments, the photoactive layer may reflect the light having the second wavelength, or convert the light having the second wavelength into light having one or more other wavelengths and radiate the light having the one or more other wavelengths.

In one or more embodiments, the photoactive layer may transmit light having wavelengths included in the first wavelength band.

In one or more embodiments, the second wavelength band may be a wavelength band in which a light transmittance of the plurality of second color filters varies greater than a light transmittance of the plurality of first color filters and a light transmittance of the plurality of third color filters.

In one or more embodiments, the second color wavelength may be shorter than the first color wavelength and longer than the third color wavelength.

In one or more embodiments, the display may further include a transistor layer located on the first substrate, and a light emitting element layer located on the transistor layer.

In one or more embodiments, the color filter layer may be located between the first substrate and the light emitting element layer.

In one or more embodiments, each of the plurality of first color filters, the plurality of second color filters, and the plurality of third color filters may not overlap with transistors disposed in the transistor layer.

In one or more embodiments, the photoactive layer may be located under the color filter layer.

In one or more embodiments, the photoactive layer may be located under the first substrate.

In one or more embodiments, the photoactive layer may be located between a transistor disposed in the transistor layer and the first substrate.

In one or more embodiments, the display may further include a transistor layer located on the first substrate, a light emitting element layer located on the transistor layer, and an encapsulation layer located on the light emitting element layer.

In one or more embodiments, the color filter layer may be located on the encapsulation layer.

In one or more embodiments, the photoactive layer may be located on the color filter layer.

In one or more embodiments, a part of the light having the second wavelength incident to an inside of the display device may pass through the two or more openings and be absorbed by the two or more second color filters overlapping the two or more openings, and another part of the light having the second wavelength incident to the inside of the display device may be, by the photoactive layer, reflected or converted into light having one or more other wavelengths and caused to move outside of the display device.

According to the example embodiments of the present disclosure, a pen touch system can be provided that includes a display device including a first substrate, a plurality of color filters transmitting light having a first wavelength included in a first wavelength band, and a photoactive layer responsive to light having a second wavelength included in a second wavelength band different from the first wavelength band, and a pen configured to output the light having the second wavelength to the display device, receive redirected light coming from the display device, and output sensing data based on the redirected light to the display device.

In one or more embodiments, the plurality of color filters may include a plurality of first color filters located in a color filter layer and transmitting first color light having a first color wavelength included in a first wavelength band, a plurality of second color filters located in the color filter layer and transmitting second color light having a second color wavelength included in the first wavelength band, and a plurality of third color filters located in the color filter layer and transmitting third color light having a third color wavelength included in the first wavelength band.

In one or more embodiments, the photoactive layer may include two or more openings.

In one or more embodiments, the two or more openings may overlap with two or more second color filters among the plurality of second color filters.

In one or more embodiments, each of the plurality of second color filters may absorb the light having the second wavelength.

In one or more embodiments, each of the plurality of first color filters and plurality of third color filters may transmit the light having the second wavelength.

In one or more embodiments, the photoactive layer may reflect the light having the second wavelength, or convert the light having the second wavelength into light having one or more other wavelengths and radiate the light having the one or more other wavelengths.

In one or more embodiments, the photoactive layer may transmit light having wavelengths included in the first wavelength band.

According to the one or more embodiments described herein, a display device and a pen touch system may be provided that are capable of more accurately sensing a pen touch based on an optical technique.

According to the one or more embodiments described herein, a display device and a pen touch system may be provided that are capable of sensing a pen touch based on an optical technique by using one or more color filters included in a display panel.

According to the one or more embodiments described herein, a display device and a pen touch system may be provided that include a display panel in which a light control structure capable of allowing a pen to sense a touch is integrated.

According to the one or more embodiments described herein, a display device and a pen touch system may be provided that include a display panel in which a light control structure configured to enable pen touch sensing while not affecting light emitting performance for image display is integrated.

According to the one or more embodiments described herein, a display device and a pen touch system may be provided that include a display panel in which a light control structure configured to allow a pen to sense a touch is integrated, and thereby, provide advantages of reducing the thickness of the display device and helping to simplify the assembly process of the display device. Thus, the one or more aspects described herein can help to reduce the weight and optimize the process of the display device. The example embodiments of the present disclosure described above have been described for illustrative purposes; those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified.

What is claimed is:

1. A display device comprising:
   a first substrate;
   a plurality of first color filters included in a color filter layer, the plurality of first color filters configured to transmit first color light having a first color wavelength included in a first wavelength band;
   a plurality of second color filters included in the color filter layer, the plurality of second color filters configured to transmit second color light having a second color wavelength included in the first wavelength band;
   a plurality of third color filters included in the color filter layer, the plurality of third color filters configured to transmit third color light having a third color wavelength included in the first wavelength band; and
   a photoactive layer responsive to light having a second wavelength included in a second wavelength band different from the first wavelength band, the photoactive layer comprising two or more openings overlapping with two or more second color filters among the plurality of second color filters.

2. The display device of claim 1, wherein the two or more openings are non-overlapping with the plurality of first color filters and the plurality of third color filters.

3. The display device of claim 1, wherein each of the plurality of second color filters absorbs the second color light having the second color wavelength, and
   wherein each of the plurality of first color filters and the plurality of third color filters transmits the second color light having the second color wavelength.

4. The display device of claim 1, wherein the photoactive layer is configured to:
   reflect the second color light having the second color wavelength, or convert the second color light having the second color wavelength into light having one or more other wavelengths and radiates the light having one or more other wavelengths.

5. The display device of claim 1, wherein the photoactive layer transmits first color light having wavelengths included in the first wavelength band.

6. The display device of claim 1, wherein the second wavelength band is a wavelength band in which a light transmittance of the plurality of second color filters varies greater than a light transmittance of the plurality of first color filters and a light transmittance of the plurality of third color filters.

7. The display device of claim 1, wherein the second color wavelength is less than the first color wavelength and greater than the third color wavelength.

8. The display device of claim 1, further comprising:
a transistor layer on the first substrate; and
a light emitting element layer on the transistor layer,
wherein the color filter layer is between the first substrate and the light emitting element layer,
wherein each of the plurality of first color filters, the plurality of second color filters, and the plurality of third color filters are non-overlapping with transistors in the transistor layer, and
wherein the photoactive layer is under the color filter layer.

9. The display device of claim 8, wherein the photoactive layer is under the first substrate, or the photoactive layer is between a transistor in the transistor layer and the first substrate.

10. The display device of claim 1, further comprising:
a transistor layer on the first substrate;
a light emitting element layer on the transistor layer; and
an encapsulation layer on the light emitting element layer,
wherein the color filter layer is on the encapsulation layer, and the photoactive layer is on the color filter layer.

11. The display device of claim 10, wherein each of the plurality of first color filters, the plurality of second color filters, and the plurality of third color filters is configured to overlap with transistors disposed in the transistor layer.

12. The display device of claim 1, wherein a part of the second color light having the second color wavelength that is incident to an inside of the display device passes through the two or more openings and is absorbed by the two or more second color filters overlapping the two or more openings, and another part of the second color light having the second wavelength that is incident to the inside of the display device is, by the photoactive layer, reflected or converted into light having one or more other wavelengths and caused to move outside of the display device.

13. A pen touch system comprising:
a display device comprising a first substrate, a plurality of color filters transmitting light having a first wavelength included in a first wavelength band, and a photoactive layer responsive to light having a second wavelength included in a second wavelength band different from the first wavelength band; and
a pen configured to output the light having the second wavelength to the display device, receive the light having the second wavelength or light having one or more wavelengths different from the second wavelength redirected by the display device, and output sensing data to the display device,
wherein the plurality of color filters comprise:
a plurality of first color filters in a color filter layer, the plurality of first color filters configured to transmit first color light having a first color wavelength included in a first wavelength band;
a plurality of second color filters in the color filter layer, the plurality of second color filters configured to transmit second color light having a second color wavelength included in the first wavelength band; and
a plurality of third color filters in the color filter layer, the plurality of third color filters configured to transmit third color light having a third color wavelength included in the first wavelength band, and
wherein the photoactive layer comprises two or more openings, and the two or more openings overlap with two or more second color filters among the plurality of second color filters.

14. The pen touch system of claim 13, wherein each of the plurality of second color filters absorbs the second color light having the second color wavelength, and
wherein each of the plurality of first color filters and the plurality of third color filters transmits the second color light having the second color wavelength.

15. The pen touch system of claim 13, wherein the photoactive layer is configured to:
reflect the second color light having the second color wavelength, or
convert the second color light having the second color wavelength into light having one or more other wavelengths and radiate the light having the one or more other wavelengths.

16. The pen touch system of claim 15, wherein the photoactive layer transmits light having wavelengths included in the first wavelength band.

17. A pen touch system comprising:
a display device comprising a first substrate, a plurality of subpixels and a code pattern layer for pen touch sensing, and the code pattern layer comprising a photoactive layer and at least one absorption pattern,
wherein the plurality of subpixels include a plurality of first subpixels emitting first color light having a first color wavelength included in a first wavelength band, a plurality of second subpixels emitting second color light having a second color wavelength included in the first wavelength band, and a plurality of third subpixels emitting third color light having a third color wavelength included in the first wavelength band, and
wherein the photoactive layer is responsive to light having a second wavelength included in a second wavelength band different from the first wavelength band and includes a plurality of openings, and the at least one absorption pattern is configured to absorb light having the second wavelength, each of the plurality of openings overlaps with a corresponding absorption pattern; and
a pen configured to output the light having the second wavelength to the display device, receive the light having the second wavelength or light having one or more wavelengths different from the second wavelength redirected by the display device, and output sensing data to the display device.

18. The pen touch system of claim 17, wherein at least one insulating layer is disposed between the photoactive layer and the at least one absorption pattern included in the code pattern layer.

19. The pen touch system of claim 17, wherein the code pattern layer includes a plurality of data cell areas arranged in rows and columns, a plurality of first cell guide lines, each of which is disposed between adjacent data cell areas in a first direction, and a plurality of second cell guide lines, each of which is disposed between adjacent data cell areas in a second direction different from the first direction.

20. The pen touch system of claim 19, wherein the code pattern layer further includes a plurality of data code patterns disposed in each of the plurality of data cell areas and arranged in rows and columns, a pattern in which the plurality of data code patterns are arranged is configured to be different for each of the plurality of data cell areas.

* * * * *